(12) United States Patent
Shimohata et al.

(10) Patent No.: US 9,381,428 B2
(45) Date of Patent: Jul. 5, 2016

(54) INFORMATION PROCESSING APPARATUS, INFORMATION PROCESSING SYSTEM, AND INFORMATION PROCESSING METHOD

(75) Inventors: Yasuyuki Shimohata, Kyoto (JP); Ryoji Kuroda, Kyoto (JP); Kazuhiro Hosoi, Kyoto (JP); Takanori Okamura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 397 days.

(21) Appl. No.: 13/208,767

(22) Filed: Aug. 12, 2011

(65) Prior Publication Data
US 2012/0046767 A1    Feb. 23, 2012

(30) Foreign Application Priority Data

Aug. 20, 2010 (JP) ................................. 2010-185369

(51) Int. Cl.
| A63F 9/24 | (2006.01) |
| A63F 13/00 | (2014.01) |
| G06F 17/00 | (2006.01) |
| G06F 19/00 | (2011.01) |
| A63F 13/90 | (2014.01) |

(52) U.S. Cl.
CPC ............ *A63F 13/08* (2013.01); *A63F 2300/69* (2013.01)

(58) Field of Classification Search
USPC ............. 463/30, 36, 42; 700/91, 92; 709/206, 709/223, 224
See application file for complete search history.

(56) References Cited

U.S. PATENT DOCUMENTS

| 4,907,150 A * | 3/1990 | Arroyo ...................... G06F 1/26 713/323 |
| 6,640,145 B2 * | 10/2003 | Hoffberg et al. ................ 700/83 |
| 7,613,782 B2 * | 11/2009 | Nakajima et al. ............. 709/206 |
| 2001/0044588 A1 * | 11/2001 | Mault .................. A61B 5/0002 600/549 |
| 2002/0113796 A1 * | 8/2002 | Oshiyama ............ H04N 1/3876 345/581 |
| 2004/0148083 A1 * | 7/2004 | Arakawa ................ G07C 5/008 701/50 |

(Continued)

FOREIGN PATENT DOCUMENTS

| JP | 2000-138978 | 5/2000 |
| JP | 2000-181584 | 6/2000 |

(Continued)

OTHER PUBLICATIONS

Michael Jackman, "Are you sleeping? Understanding hibernation, standby, and other power management features," Dec. 7, 2000, https://web.archive.org/web/20080510173315/http://articles.techrepublic.com.com/5100-10878_11-1056082.html.*

*Primary Examiner* — Kevin Y Kim
(74) *Attorney, Agent, or Firm* — Nixon & Vanderhye P.C.

(57) ABSTRACT

An information processing apparatus is set to always obtain information, even while an application is not being executed, and effectively using the obtained information. A state of the environment in a place where the information processing apparatus is present is detected. Detection data indicating the state of the environment detected by the detection section is stored. An operation mode is switched at least between a normal mode in which power is being supplied to the application execution section and the predetermined application can be executed, and a power saving mode in which at least supply of power to the application execution section is restricted and the predetermined application cannot be executed. At least in the power saving mode, a state of the environment is detected, and detection data indicating the state of the environment detected is stored in the first storage section at predetermined time intervals.

21 Claims, 18 Drawing Sheets

(56) References Cited

U.S. PATENT DOCUMENTS

| | | | |
|---|---|---|---|
| 2006/0010699 A1* | 1/2006 | Tamura | G01C 17/28 33/355 R |
| 2006/0200253 A1* | 9/2006 | Hoffberg et al. | 700/19 |
| 2008/0119281 A1 | 5/2008 | Hirose et al. | |
| 2008/0220874 A1 | 9/2008 | Tatsumi et al. | |
| 2010/0138037 A1* | 6/2010 | Adelberg et al. | 700/241 |
| 2010/0151946 A1* | 6/2010 | Wilson et al. | 463/36 |
| 2011/0294426 A1* | 12/2011 | Matsubara et al. | 455/41.2 |

FOREIGN PATENT DOCUMENTS

| | | |
|---|---|---|
| JP | 2008-117424 | 5/2008 |
| JP | 2008-125614 | 6/2008 |
| JP | 2008-200137 | 9/2008 |

* cited by examiner

F I G. 4
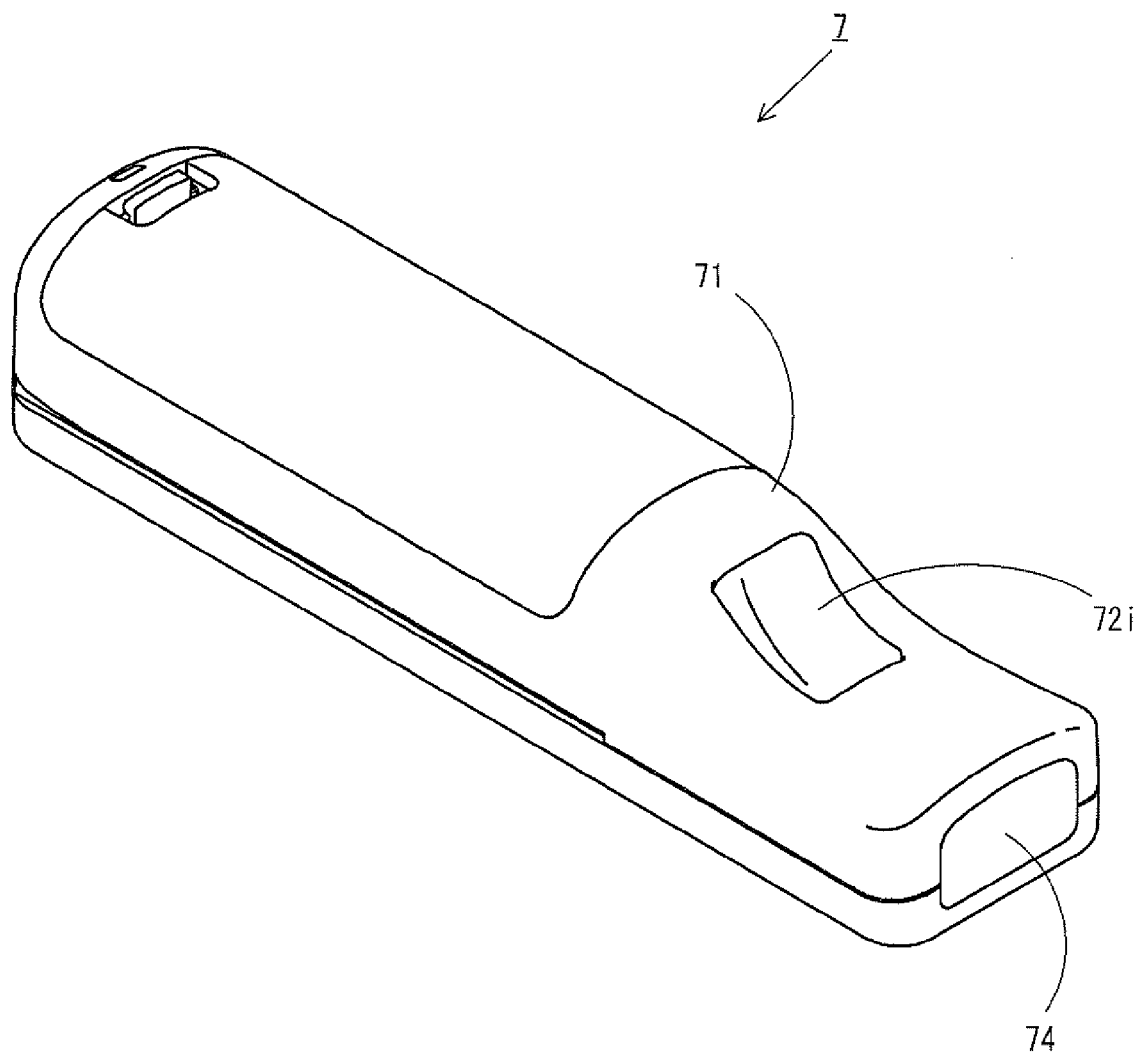

F I G. 8
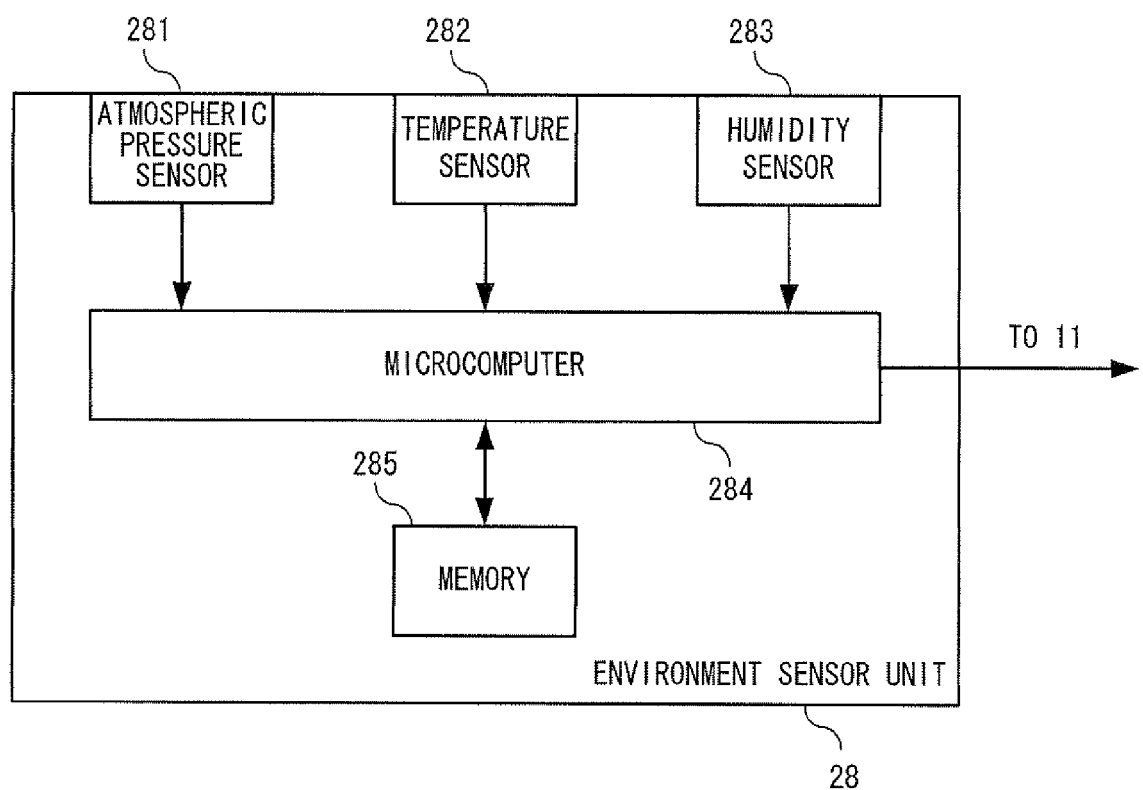

INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-185369, filed on Aug. 20, 2010, is incorporated herein by reference.

FIELD

The technology herein relates to an information processing apparatus, an information processing system, and an information processing method, and more particularly, to an information processing apparatus, an information processing system, and an information processing method that are capable of, for example, obtaining an output from a sensor detecting a state of the environment in a place where the information processing apparatus is present.

BACKGROUND AND SUMMARY

Conventionally, game apparatuses that transmit or receive data via a network have been known (for example, see Japanese Laid-Open Patent Publication No. 2008-125614). A game apparatus disclosed in Japanese Laid-Open Patent Publication No. 2008-125614 is capable of switching the state of the game apparatus between a normal state in which an application can be executed and a standby state in which power consumption is restricted, and performs, at least in the standby state, processing of transmitting or receiving data via a network.

However, the game apparatus disclosed in Japanese Laid-Open Patent Publication No. 2008-125614 merely transmits or receives data via a network, and information to be obtained by the reception is limited to information obtained via a network. Therefore, the game apparatus cannot effectively use the characteristic that the game apparatus can always obtain data. In addition, since the game apparatus needs to be connected to a network in order to obtain data, the game apparatus cannot use data in a situation in which the game apparatus cannot be connected to a network.

Therefore, an object of certain example embodiments is to provide an information processing apparatus, an information processing system, and an information processing method that that are capable of always obtaining information even while any application is not being executed, and effectively using the obtained information.

In order to attain the above object, certain example embodiments may employ the following configuration, for example. It should be understood that the scope of the present invention is interpreted only by the scope of the claims. In event of any conflict between the scope of the claims and the scope of the description in this section, the scope of the claims has priority.

One aspect of an information processing apparatus according to certain example embodiments is an information processing apparatus which executes a predetermined application, the information processing apparatus comprising: a detection section; a first storage section; an application execution section; an operation mode switching section; and a detection data control section. The detection section for detecting a state of the environment in a place where the information processing apparatus is present. The first storage section for storing detection data indicating the state of the environment detected by the detection section. The application execution section for executing the predetermined application. The operation mode switching section for switching an operation mode at least between a normal mode in which power is being supplied to the application execution section and the predetermined application can be executed, and a power saving mode in which at least supply of power to the application execution section is restricted and the predetermined application cannot be executed. The a detection data control section for, at least in the power saving mode, causing the detection section to detect a state of the environment, and storing, in the first storage section, at predetermined time intervals, detection data indicating the state of the environment detected by the detection section.

According to the above aspect, even in the power saving mode in which any application is not being executed, a state of the environment is always detected and the detection data indicating the state of the environment detected is stored, whereby it becomes possible to effectively use information indicating the state of the environment obtained in the power saving mode.

In another aspect, the detection section may include at least one of an atmospheric pressure sensor, a temperature sensor, and a humidity sensor.

According to the other aspect, it becomes possible to execute various applications using the detection data indicating the state of the environment, such as an application predicting the weather, an application estimating a time of year, and an application estimating the presence condition in a room.

In another aspect, the application execution section can, in the normal mode, execute an application selected from a plurality of applications including an application using the detection data.

According to the other aspect, an application is executed by using the detection data indicating a state of the environment, whereby it becomes possible to perform processing that effectively uses data obtained while the application is not being executed.

In another aspect, the detection data control section may, at least both in the normal mode and in the power saving mode, cause the detection section to detect a state of the environment, and store, in the first storage section, at predetermined time intervals, detection data indicating the state of the environment detected by the detection section.

According to the other aspect, data obtained while an application is being executed as well as data obtained while any application is not being executed can be used, whereby it becomes possible to more effectively use information indicating a state of the environment obtained.

In another aspect, the information processing apparatus may further comprise: a second storage section; and a data transfer control section. The second storage section has a larger storage capacity than that of the first storage section. The data transfer control section, when the operation mode is shifted from the power saving mode to the normal mode, stores, in the second storage section, the detection data stored in the first storage section. In this case, the application execution section, in executing the application using the detection data, uses the detection data stored in the second storage section.

According to the other aspect, the detection data stored in the first storage section at the predetermined time intervals is transferred to the second storage section when the operation mode is shifted to the normal mode, whereby it becomes possible to store detection data in the information processing apparatus even if the storage section has a smaller capacity.

In another aspect, the information processing apparatus may further comprise: a second storage section; and a data transfer control section. The second storage section has a larger storage capacity than that of the first storage section. The data transfer control section, in the power saving mode, stores, in the second storage section, with a predetermined period, the detection data stored in the first storage section. In this case, the application execution section, in executing the application using the detection data, uses the detection data stored in the second storage section.

According to the other aspect, the detection data stored in the first storage section at the predetermined time intervals is transferred to the second storage section with a predetermined period, whereby it becomes possible to store detection data in the information processing apparatus even if the storage section has a smaller capacity.

In another aspect, the information processing apparatus may further comprise: a communication section; and a data communication control section. The communication section communicates data with another apparatus via a network. The data communication control section, in the power saving mode, transmits the detection data to the other apparatus via the communication section with a predetermined period.

According to the other aspect, the detection data detected at the predetermined time intervals is transmitted to another apparatus (for example, a server) with a predetermined period, whereby it becomes possible for the other apparatus to perform processing using the detection data transmitted from one or more information processing apparatuses.

In another aspect, the detection section may include at least the atmospheric pressure sensor. In this case, the detection data control section stores, as the detection data, atmospheric pressure data indicating the value of the atmospheric pressure detected by the atmospheric pressure sensor, in the first storage section. The application execution section, in executing the application using the detection data, performs processing of predicting the weather based on the atmospheric pressure data.

According to the other aspect, it becomes possible to predict the weather in a place where the information processing apparatus is present by using the detection data indicating a state of the environment, and to report, to a user, the predicted weather based on the result of the prediction.

In another aspect, the application execution section may execute an application of a game as the application using the detection data, and perform processing of the game by using the predicted weather.

According to the other aspect, it becomes possible to change the content of a game, based on the weather predicted by using the detection data indicating a state of the environment.

In another aspect, the information processing apparatus may further comprise: a signal output section; and a signal pattern control section. The signal output section outputs a radio signal having a predetermined signal pattern to another apparatus that can be remotely operated by means of wireless communication. The signal pattern control section controls the signal pattern of the radio signal outputted by the signal output section. In this case, the application execution section, in executing the application using the detection data, causes the signal output section to output a radio signal having a signal pattern that causes the other apparatus to operate, via the signal pattern control section, based on a comparison between a threshold value and a detection value indicated by the detection data.

According to the other aspect, it becomes possible to control the operation of another apparatus that can be remotely operated, by using the detection data indicating a state of the environment.

In another aspect, the signal output section may output an infrared light signal having a predetermined signal pattern to an air conditioner by means of infrared communication. The detection section may include at least the temperature sensor. In this case, the detection data control section stores, as the detection data, temperature data indicating the value of the temperature detected by the temperature sensor, in the first storage section. The application execution section, in executing the application using the detection data, when the value of the temperature indicated by the temperature data is higher than a first threshold value, causes the signal output section to output an infrared light signal having a signal pattern that causes the air conditioner to operate in a cooling mode, and when the value of the temperature indicated by the temperature data is lower than a second threshold value smaller than the first threshold value, causes the signal output section to output an infrared light signal having a signal pattern that causes the air conditioner to operate in a heating mode.

According to the other aspect, it becomes possible to control the operation of an air conditioner that can be remotely operated by means of infrared communication, by using the detection data indicating the temperature in a place where the information processing apparatus is present.

In addition, the information processing apparatus may be able to be operated by an input apparatus including an imaging section for taking an image of infrared light, which is an imaging target, outputted by the signal output section. In this case, the application execution section, in executing an application selected from the plurality of applications, calculates a motion of the input apparatus, based on the position of the imaging target on the image taken by the imaging section, and performs processing according to the motion.

According to the other aspect, it becomes possible to use an infrared light output section, for controlling remote operation of an air conditioner, which infrared light output section is, being an imaging target, originally used for pointing operation.

In another aspect, certain example embodiments may be implemented as an information processing system including at least a server and a plurality of the information processing apparatuses. In this case, the detection section includes at least the atmospheric pressure sensor. The detection data control section stores, as the detection data, atmospheric pressure data indicating the value of the atmospheric pressure detected by the atmospheric pressure sensor, in the first storage section. The data communication control section transmits the atmospheric pressure data to the server via the communication section. The server draws an isobar based on the values of the atmospheric pressures indicated by the respective pieces of atmospheric pressure data obtained from the plurality of the information processing apparatuses, and creates a weather chart including the isobar.

According to the other aspect, it becomes possible to create a weather chart (isobars) based on the values of the atmospheric pressure detected in multiple regions, and to perform new types of information processing based on multiple pieces of information.

In another aspect, certain example embodiments may be implemented as an information processing method including steps of operations performed by the respective above elements.

According to the above aspects, even in the power saving mode in which any application is not being executed, a state of the environment is always detected and the detection data indicating the state of the environment detected is stored, whereby it becomes possible to effectively use information indicating the state of the environment obtained in the power saving mode.

These and other objects, features, aspects and advantages of certain example embodiments will become more apparent from the following detailed description when taken in conjunction with the accompanying drawings.

BRIEF DESCRIPTION OF THE DRAWINGS

FIG. 4 is a perspective view of the controller 7 shown in FIG. 3 as viewed from the bottom front side thereof;

FIG. 8 is a block diagram showing an example of the configuration of an environment sensor unit 28 shown in FIG. 2;

DESCRIPTION OF THE PREFERRED EMBODIMENTS

Figure 1:
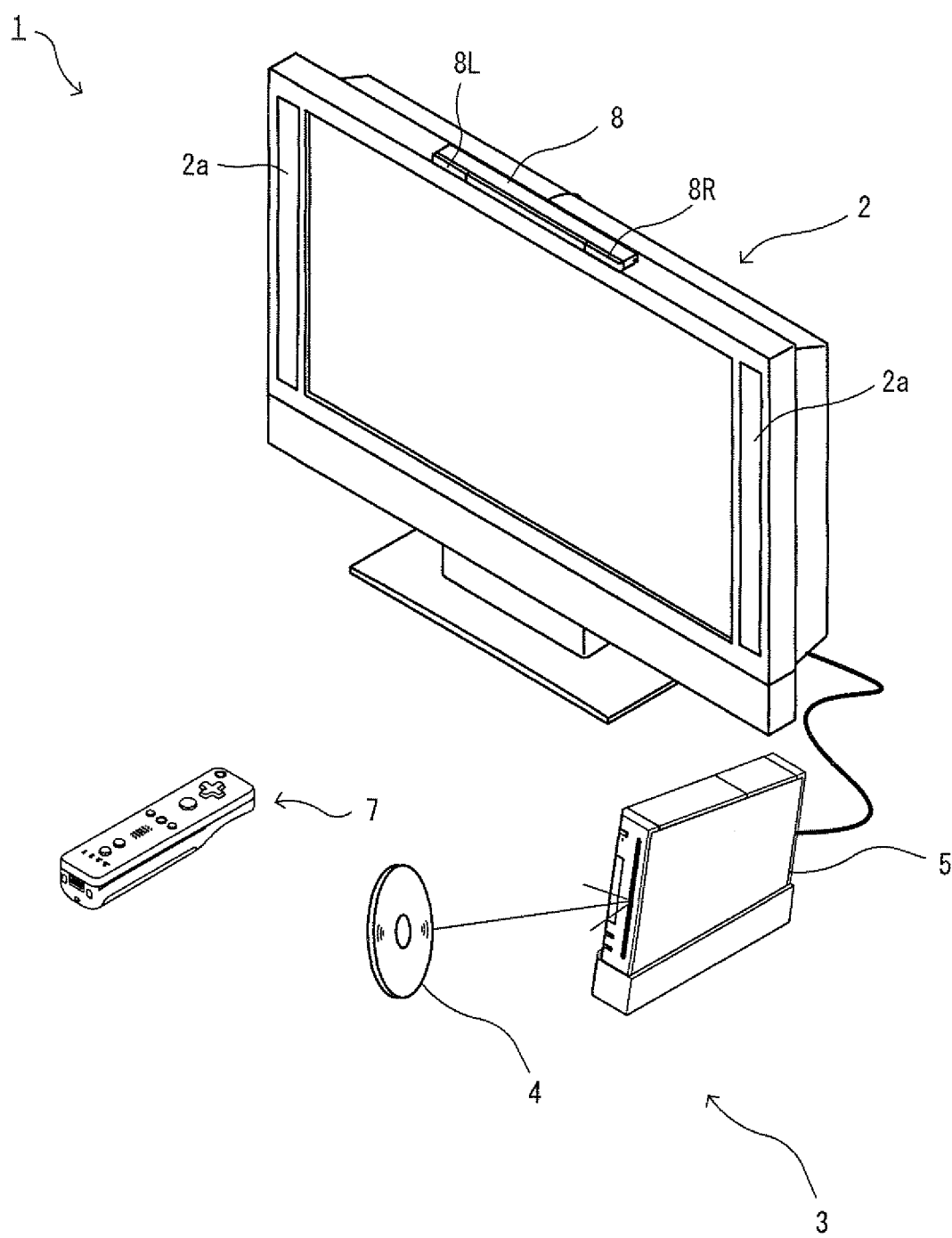
FIG. 1 is an external view illustrating a game system 1 according to an embodiment.
Figure 2:
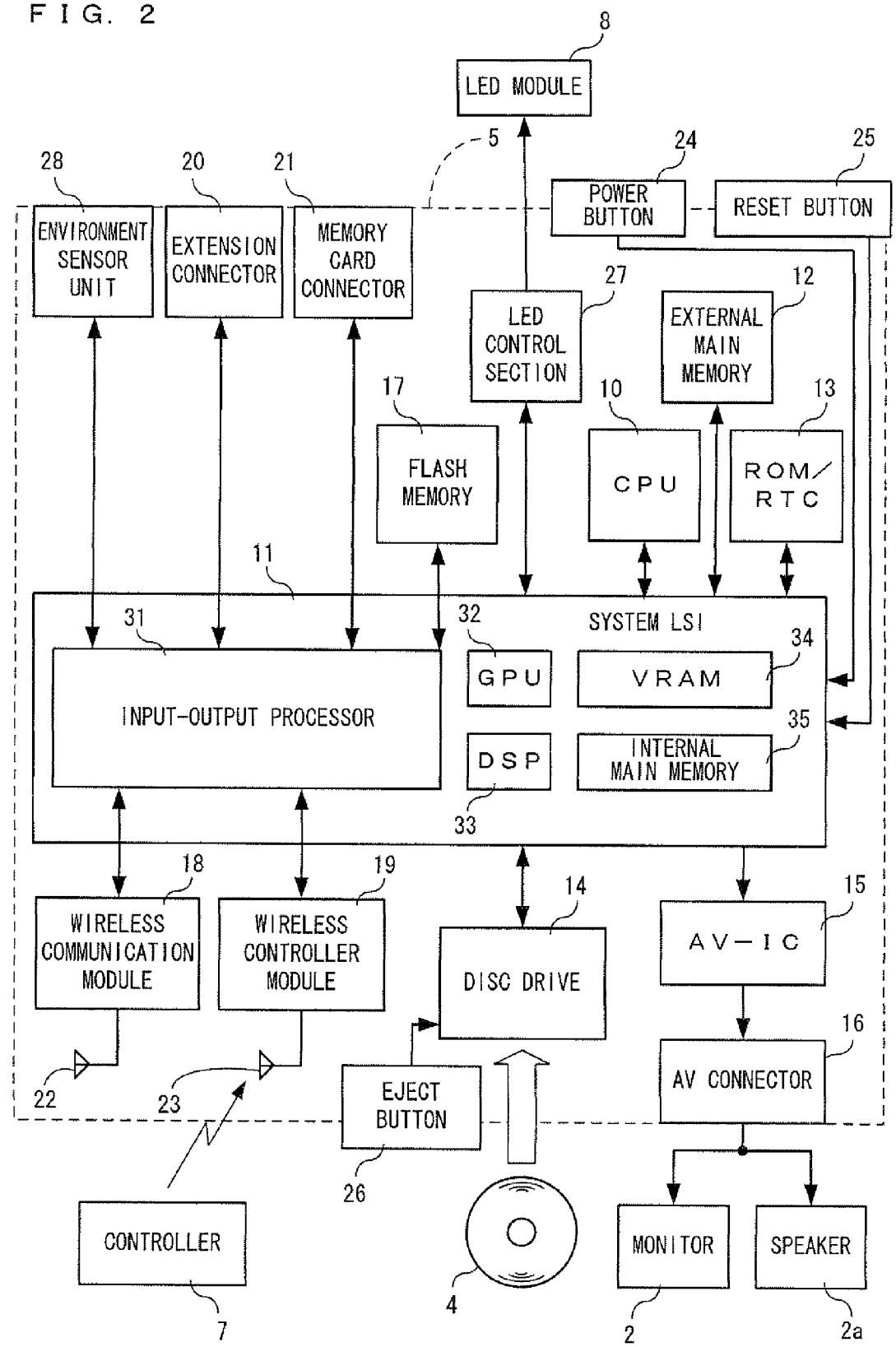
FIG. 2 is a function block diagram of a game apparatus main body 5 shown in FIG. 1.

With reference to FIG. 1, an information processing apparatus according to an embodiment will be described. Hereinafter, in order to provide a specific description, a game system including a game apparatus main body 5 which is a stationary game apparatus body corresponding to an example of the information processing apparatus will be described. FIG. 1 is an external view illustrating an example of the game system 1 including a stationary game apparatus 3. FIG. 2 is a block diagram illustrating an example of the game apparatus main body 5. Hereinafter, the game system 1 will be described.

As shown in FIG. 1, the game system 1 includes: a household television receiver (hereinafter, referred to as a monitor) 2 which is an example of display means; and a game apparatus 3 which is a stationary game apparatus and is connected to the monitor 2 via a connection cord. The monitor 2 includes a speaker 2a for outputting as a sound an audio signal from the game apparatus 3. Further, the game apparatus 3 includes: an optical disc 4 storing an information processing program; the game apparatus main body 5 having a computer for executing the programs stored in the optical disc 4 to output to and display on the monitor 2 an information processing screen; a controller 7 for providing the game apparatus main body 5 with operation information necessary for operating, for example, objects displayed on the display screen; and an LED module 8.

The LED module 8 is located on the periphery of the monitor 2 (at a side above a screen shown in FIG. 1). The LED module 8 has two markers 8L and 8R at both ends thereof, and is connected to the game apparatus main body 5. For example, the markers 8L and 8R are each configured with one or more infrared LEDs, and each outputs infrared radiation forward from the monitor 2. The game apparatus main body 5 is capable of controlling lighting of each of the infrared LEDs provided to the LED module 8. In the present embodiment, the markers 8L and 8R are used for an operation using the controller 7, and also used as means for transmitting an infrared light signal to control apparatuses (for example, air conditioner) that are controlled by receiving an infrared light signal.

The game apparatus main body 5 has a wireless controller module 19 (see FIG. 2) incorporated therein. The wireless controller module 19 receives data which is wirelessly transmitted from the controller 7, and allows the game apparatus main body 5 to transmit the data to the controller 7, thereby connecting between the controller 7 and the game apparatus main body 5 through wireless communication. Further, into the game apparatus main body 5, the optical disc 4, which typifies an information storage medium and is exchangeable with respect to the game apparatus main body 5, is detachably mounted.

The game apparatus main body 5 has mounted thereto a flash memory 17 (see FIG. 2) which functions as a backup memory which fixedly stores data such as saved data. The game apparatus main body 5 executes the information processing program or the like which is stored in the optical disc 4, to display an image indicating the obtained result on the monitor 2. Such a program to be executed may be previously stored in the flash memory 17 as well as in the optical disc 4. Further, the game apparatus main body 5 may reproduce a state that has been previously obtained, by using the saved data stored in the flash memory 17, and display an image on the monitor 2. A user of the game apparatus 3 can operate the controller 7 while viewing the image displayed on the monitor 2, thereby progressing information processing or enjoying a game.

The controller 7 wirelessly transmits transmission data such as operation information, by using, for example, the Bluetooth (registered trademark) technology, to the game apparatus main body 5 having the wireless controller module 19 incorporated therein. The controller 7 is operation means for mainly operating a player object and the like displayed on the display screen of the monitor 2. The controller 7 is provided with a housing which is small enough to be held by one hand, and a plurality of operation buttons (including a cross key and a stick) which are exposed at the surface of the housing. In addition, as is apparent from the below description, the controller 7 has an imaging information calculation section 74 for taking an image as viewed from the controller 7. The markers 8L and 8R are an example of an object whose image is to be shot by the imaging information calculation section 74. In addition, the controller 7 receives, by means of a communication section 75, the transmission data which is wirelessly transmitted form the wireless controller module 19 of the game apparatus main body 5, and can generate a sound and a vibration in accordance with the transmission data.

Next, with reference to FIG. 2, an internal structure of the game apparatus main body 5 will be described. FIG. 2 is a block diagram illustrating an exemplary structure of the game apparatus main body 5. The game apparatus main body 5 includes: a CPU (central processing unit) 10; a system LSI (large scale integration) 11; an external main memory 12; a ROM/RTC (read only memory/real time clock) 13; a disc drive 14; an AV-IC (audio video-integrated circuit) 15, and the like.

The CPU 10, serving as a game processor, executes the program stored in the optical disc 4 to perform a processing. The CPU 10 is connected to the system LSI 11. In addition to the CPU 10, the external main memory 12, the ROM/RTC 13, the disc drive 14, the AV-IC 15, an LED control section 27, and the like are also connected to the system LSI 11. The system LSI 11 performs processing such as control of data transmission between respective components connected thereto, generation of an image to be displayed, and acquisition of data from an external apparatus. An internal structure of the system LSI 11 will be described below. The external main memory 12, which is of a volatile type, stores programs or data loaded from the optical disc 4 or the flash memory 17, and stores other various data. The external main memory 12 is used as a work area and a buffer area for the CPU 10. The ROM/RTC 13 includes a ROM (so-called a boot ROM) incorporating a program for booting the game apparatus main body 5, and a clock circuit (RTC) for counting time. In addition, the ROM/RTC 13 sets alarm interrupt as a wake-up event for the CPU 10 or an input/output processor 31 described later. For example, in the ROM/RTC 13, a trigger is generated every predetermined time that is a unit of time of processing. When the trigger has been generated, a scheduled time of an event of transferring data or transmission and reception of data, and the time at which the trigger has been generated are compared. If the time of the trigger generation is later than the scheduled time of the event, alarm interrupt is set as a wake-up event for the input/output processor 31, whereby the input/output processor 31, an internal main memory 35, and the flash memory 17 are booted up. The disc drive 14 reads, from the optical disc 4, program data, texture data and the like, and writes the read data into an internal main memory 35 described below or the external main memory 12. The LED control section 27 is connected to the infrared LEDs included in the LED module 8. When the CPU 10 turns the infrared LEDs on, the CPU 10 issues a command to the LED control section 27 for power feeding. In response to the command from the CPU 10 for the power feeding, the LED control section 27 feeds the power to the infrared LEDs, whereby the infrared LEDs are turned on. Specifically, the LED control section 27 turns on and off the infrared LEDs provided to the LED module 8 in accordance with a signal pattern indicated by the CPU 10.

Provided in the system LSI 11 are an input/output processor 31, a GPU (graphics processor unit) 32, a DSP (digital signal processor) 33, a VRAM (video RAM) 34, and the internal main memory 35. These component 31 to 35 are connected to each other via an internal bus not shown.

The GPU 32, which is a part of rendering means, generates an image in accordance with a graphics command (draw command) supplied from the CPU 10. The VRAM 34 stores data (such as polygon data and texture data) necessary for the GPU 32 to execute the graphics command. When an image is generated, the GPU 32 generates image data by using the data stored in the VRAM 3

The DSP 33 functions as an audio processor, and generates audio data by using sound data and sound waveform (tone quality) data stored in the internal main memory 35 and the external main memory 12.

The image data and the audio data generated as described above, are read by the AV-IC 15. The AV-IC 15 outputs the read image data to the monitor 2 via an AV connector 16, and also outputs the read audio data to the speaker 2a of the monitor 2. Thus, an image is displayed on the monitor 2, and a sound is outputted from the speaker 2a.

The input/output processor (I/O processor) 31 executes data reception and transmission among the components connected thereto and download of data from an external apparatus. The I/O processor 31 is connected to the flash memory 17, a wireless communication module 18, the wireless controller module 19, an extension connector 20, an memory card connector 21, and an environment sensor unit 28. To the wireless communication module 18, an antenna 22 is connected, and to the wireless controller module 19, an antenna 23 is connected.

The I/O processor 31 is connected to a network via the wireless communication module 18 and the antenna 22 and can communicate with other game apparatuses or various servers connected to the network. The I/O processor 31 accesses the flash memory 17 at regular time intervals to detect for data to be transmitted to the network. When the data to be transmitted is detected, the data is transmitted to the network via the wireless communication module 18 and the antenna 22. Further, the I/O processor 31 receives, via the network, the antenna 22 and the wireless communication module 18, data transmitted from the other game apparatuses or data downloaded from a download server, and stores the received data in the flash memory 17. The CPU 10 executes the program to read the data stored in the flash memory 17, thereby using the read data on the program. The flash memory 17 may store the data transmitted and received among the game apparatus main body 5, and other game apparatuses or the various servers, and also may store saved data (result data or intermediate step data of the process) of a game played with the game apparatus main body 5, or management data (management information specific to the game apparatus 3, including identification information and a mail address of the game apparatus 3, a profile of a user, positional information of the game apparatus 3 (for example, an address and a floor where the game apparatus 3 is placed)). The management data to be stored in the flash memory 17 is registered by a user of the game apparatus 3 inputting the management data in advance, for example.

Further, the I/O processor 31 receives the operation data and the like transmitted from the controller 7 via the antenna 23 and the wireless controller module 19, and (temporarily) stores the operation data and the like in a buffer area of the internal main memory 35 or the external main memory 12. The internal main memory 35 may store programs loaded from the optical disc 4 or the flash memory 17, and various data, and may be used as a work area and a buffer area for the CPU 10, as with the external main memory 12.

The I/O processor 31 is connected to the extension connector 20 and the memory card connector 21. The extension connector 20, which is a connector used for interface such as a USB and an SCSI, allows communication with the network, without using the wireless communication module 18, by connecting, to the extension connector 20, a media such as an external storage medium, or a peripheral device such as another controller, or a wired communication connector. The memory card connector 21 is a connector for connecting to the memory card connector 21 the external storage medium such as a memory card. For example, the I/O processor 31 accesses the external storage medium via the extension connector 20 or the memory card connector 21, to store data in the external storage medium or read data from the external storage medium.

The game apparatus main body 5 includes (on, for example, a front portion of its main surface): a power button 24 for the game apparatus main body 5; a reset button 25 for a game process; an insertion opening through which the optical disc 4 is mounted or dismounted; an eject button 26 for ejecting the optical disc 4 through an insertion opening of the game apparatus main body 5; and the like. The power button 24 and the reset button 25 are connected to the system LSI 11. When the power button 24 is pressed so as to be ON, the power is supplied to the respective components of the game apparatus main body 5 via an AC adapter which is not shown. When the reset button 25 is pressed, the system LSI 11 restarts a boot program of the game apparatus main body 5. The eject button 26 is connected to the disc drive 14. When the eject button 26 is pressed, the optical disc 4 is ejected from the disc drive 14.

The environment sensor unit 28 is connected to the input-output processor 31. When the input-output processor 31 has been booted up by the power button 24 of the game apparatus main body 5 being turned on, or by a wake-up event set by the ROM/RTC 13 being executed as alarm interrupt, the input-output processor 31 stores detection data stored in the environment sensor unit 28, in the flash memory 17. In the present embodiment, even if the power button 24 of the game apparatus main body 5 is not on, as long as power is being supplied to the game apparatus main body 5 via an AC adapter, at least the ROM/RTC 13 and the environment sensor unit 28 are always maintained in an active state (power saving mode). When the wake-up even set by the ROM/RTC 13 has been executed as alarm interrupt, at least the input-output processor 31, the internal main memory 35, and the flash memory 17 are also booted up, and then the input-output processor 31 stores, in the flash memory 17, detection data indicating a result of detection performed in the power saving mode by the environment sensor unit 28. It is noted that the internal configuration of the environment sensor unit 28 will be described later.

Figure 3:
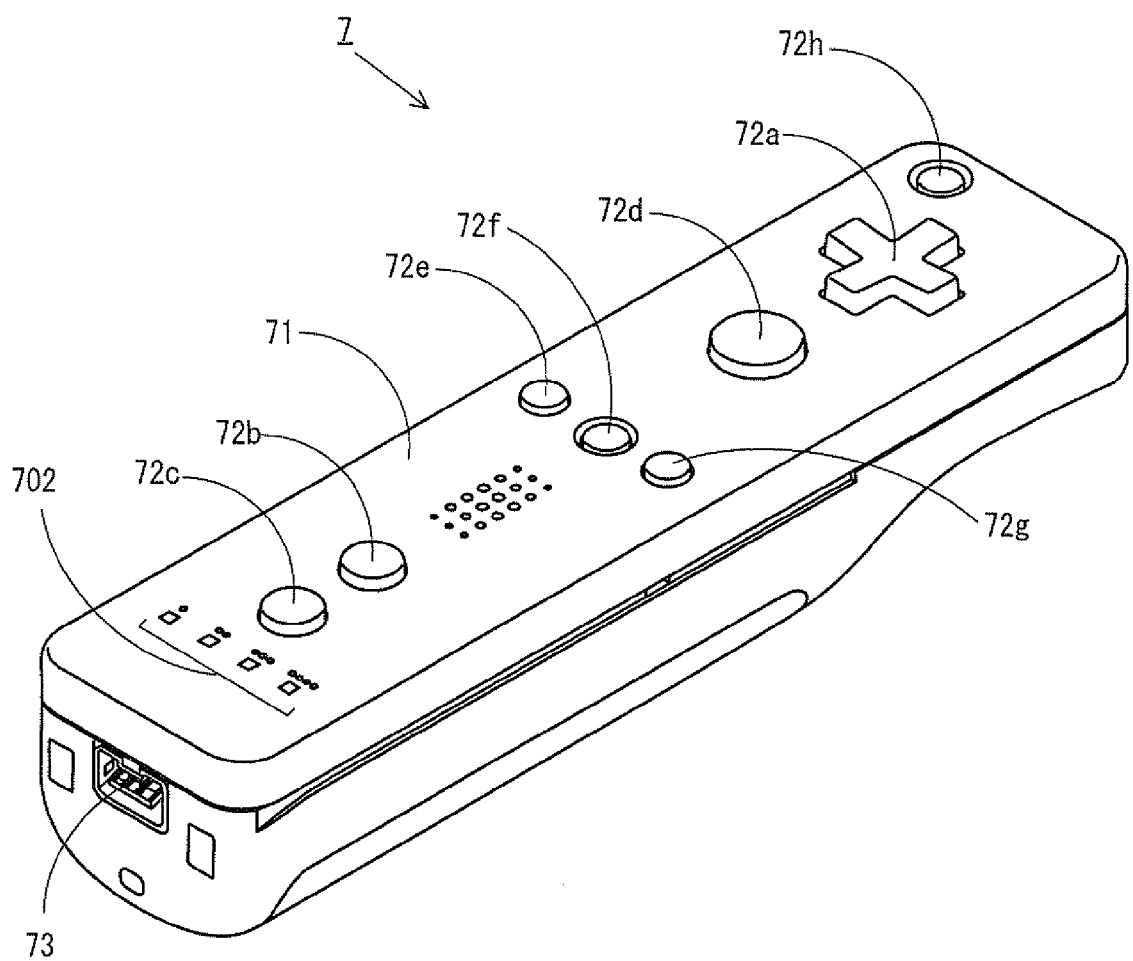
FIG. 3 is a perspective view of a controller 7 shown in FIG. 1 as viewed from the top rear side thereof.
Figure 5:
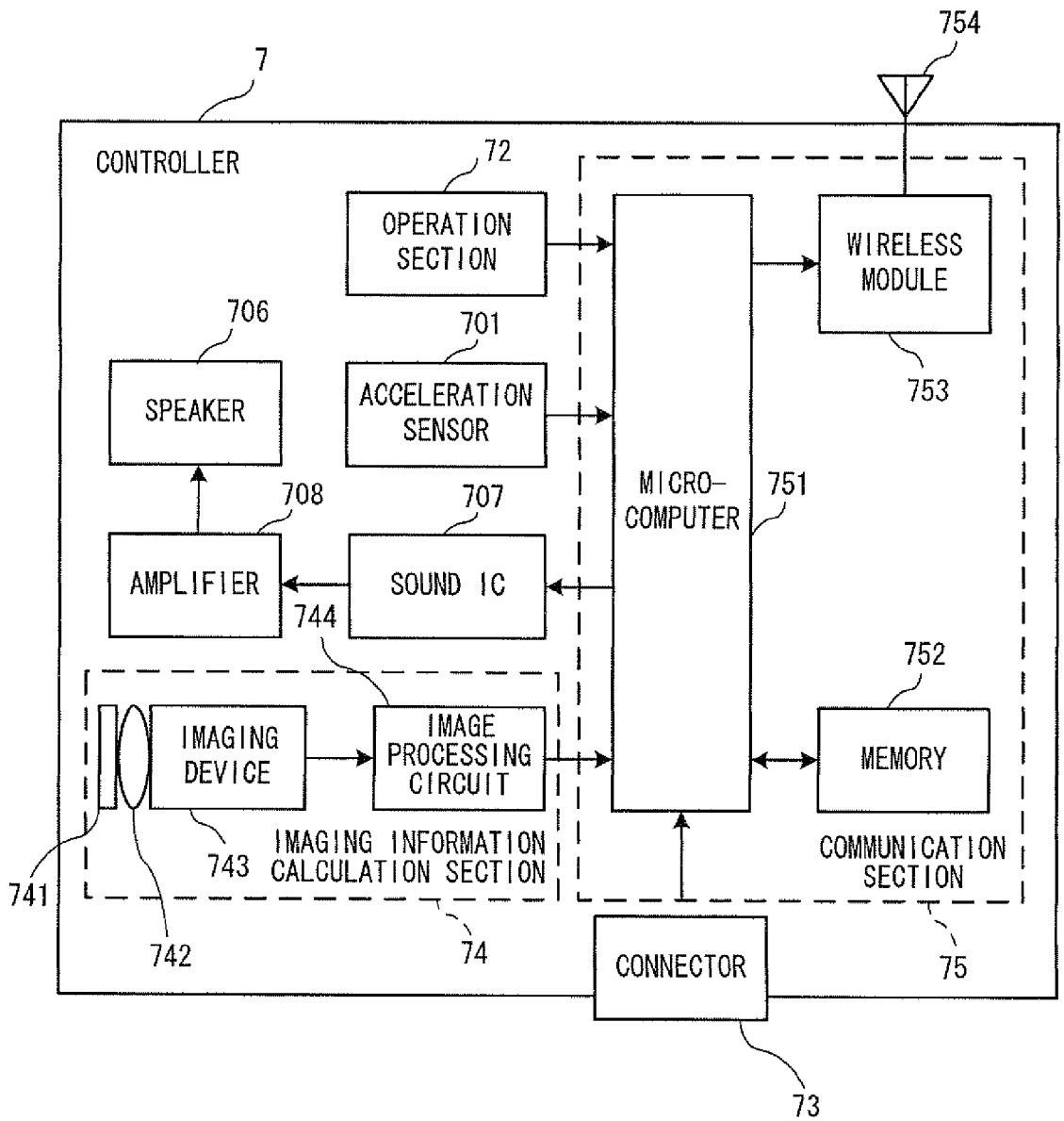
FIG. 5 is a block diagram showing the configuration of the controller 7 shown in FIG. 3.

With reference to FIGS. 3 to 5, the controller 7 will be described. FIG. 3 is a perspective view of the controller 7 as viewed from the top rear side thereof. FIG. 4 is a perspective view of the controller 7 as viewed from the bottom front side thereof. FIG. 5 is a block diagram showing an example of the configuration of the controller 7.

As shown in FIGS. 3 and 4, the controller 7 includes a housing 71 which is formed by, for example, plastic molding, and has a plurality of operation sections 72 in the housing 71. The housing 71 has a generally parallelepiped shape extending in a longitudinal direction from front to rear. The overall size of the housing 71 is small enough to be held by one hand of an adult or even a child.

At the center of the front portion of the top surface of the housing 71, a cross key 72a is provided. The cross key 72a is a cross-shaped four-direction push switch. The cross key 72a includes operation portions corresponding to the four directions (front, rear, right and left), which are located on cross-shaped projecting portions, respectively, arranged at intervals of 90 degrees. A user selects one of the front, rear, right and left directions by pressing a corresponding one of the operation portions of the cross key 72a. Through an operation on the cross key 72a, the user can, for example, indicate a direction in which an object or the like appearing in a virtual world is to move or select one of a plurality of options.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are operation sections for outputting operation signals assigned to the operation buttons 72b, 72c, 72d, 72e, 72f and 72g, respectively, when the user presses a head thereof. For example, the operation buttons 72b, 72c, and 72d are assigned with functions of a first button, a second button, and an A button, for example. Further, the operation buttons 72e, 72f and 72g are assigned with functions of a minus button, a home button and a plus button, for example. The operation buttons 72a, 72b, 72c, 72d, 72e, 72f and 72g are assigned with various operation functions in accordance with the program executed by the game apparatus main body 5. In an exemplary arrangement shown in FIG. 3, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the user.

In front of the cross key 72a on the top surface of the housing 71, an operation button 72h is provided. The operation button 72h is a power switch for remote-controlling the power of the game apparatus main body 5 to be on or off. The operation button 72h also has a top surface thereof buried in the top surface of the housing 71, so as not to be inadvertently pressed by the user.

On the bottom surface of the housing 71, a recessed portion is formed. The recessed portion is formed at a position at which an index finger or middle finger of a user is located when the user holds the controller 7 with one hand so as to orient the front surface thereof to the markers 8L and 8R. On a slope surface of the recessed portion on the bottom surface of the housing 71, an operation button 72i is provided. The operation button 72i is an operation section acting as, for example, a B button.

On the front surface of the housing 71, an image pickup element 743 included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. On the rear surface of the housing 71, the connector 73 is provided. The connector 73 is, for example, an edge connector, and is used for engaging and connecting the controller 7 with, for example, the connection cable.

As shown in FIG. 5, the imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state image pick-up device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs, to the communication section 75, process result data representing a position coordinate point and the area size of the identified spot. The imaging information calculation section 74 is fixed to the housing 71 of the controller 7. The imaging direction of the imaging information calculation section 74 can be changed by changing the direction of the housing 71.

Here, the two markers 8L and 8R are provided in the vicinity of the display screen of the monitor 2. The markers 8L and 8R each emit infrared light forward from the monitor 2, and become imaging targets of the imaging information calculation section 74. Then, the game apparatus main body 5 calculates a position designated by the controller 7, by using position data regarding high brightness points based on the two makers 8L and 8R. Specifically, when a user holds the controller 7 such that its front surface faces the monitor 2, the infrared lights outputted from the two markers 8L and 8R are incident on the imaging information calculation section 74. The image pickup element 743 takes images of the incident infrared lights via the infrared filter 741 and the lens 742, and the image processing circuit 744 processes the taken images. In the imaging information calculation section 74, components of the infrared lights outputted from the markers 8L and 8R are detected, whereby positional information (positions of target images) and the like of the markers 8L and 8R on the taken image are obtained. For example, the image processing circuit 744 analyzes the image data taken by the image pickup element 743, eliminates, from area information of the taken image, images that are not generated by the infrared lights outputted from the markers 8L and 8R, and then determines the high brightness points as the positions of the markers 8L and 8R. The imaging information calculation section 74 obtains the positional information such as positions of the centers of gravity of the determined high brightness points. The positional information may be outputted as coordinate values whose origin point is set to a predetermined reference point on a taken image (e.g., the center or the left top corner of the taken image). Alternatively, with the position of the center of gravity at a predetermined timing being set as a reference point, the difference between the reference point and a current position of the center of gravity may be outputted as a vector. That is, in the case where a predetermined reference point is set on the taken image taken by the image pickup element 743, the positional information on the target images is used as parameters representing differences between the positions of the target images and the reference point position. The positional information is transmitted to the game apparatus main body 5, whereby, on the basis of the differences between the reference point and the positional information, the game apparatus main body 5 is capable of obtaining variations in a signal that corresponds to a movement, an attitude, a position, and the like of the imaging information calculation section 74, i.e., the controller 7, with respect to the markers 8L and 8R. Specifically, when the controller 7 is moved, the positions of the centers of gravity of the high brightness points in the image transmitted from the communication section 75 change. Therefore, a direction and a coordinate point are inputted in accordance with the change in the positions of the centers of gravity of the high brightness points, whereby the position designated by the controller 7 may be regarded as an operation input, and a direction and a coordinate point may be inputted in accordance with a direction in which the controller 7 moves.

In addition, the controller 7 includes a three-axis (X-axis, Y-axis, and Z-axis) acceleration sensor 701. The three-axis acceleration sensor 701 detects a linear acceleration in three directions, i.e., the up/down direction, the left/right direction, and the forward/backward direction. Further, acceleration detection means which detects for a linear acceleration along at least one axial directions may be used. For example, theses acceleration sensors 701 may be of the type available from Analog Devices, Inc. or STMicroelectronics N.V. The acceleration sensor 701 may be preferably of an electrostatic capacitance (capacitance-coupling) type that is based on silicon micro-machined MEMS (Micro Electro Mechanical Systems) technology. However, an acceleration detection technology (e.g., piezoelectric type or piezoresistance type) now existing or any other suitable technology later developed may be used to provide the acceleration sensor 701.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the processing. The microcomputer 751 controls an operation of the sound IC 707 based on the data received from the game apparatus main body 5 by the wireless module 753 via the antenna 754. The sound IC 707 processes the sound data and the like transmitted from the game apparatus main body 5 via the communication section 75.

Data from the controller 7 including key data representing an operation signal from the operation sections 72; X-Y-Z-axial direction acceleration data representing three-axial direction acceleration signals from the acceleration sensor 701; and the process result data indicating positional information obtained in the imaging information calculation section 74, are outputted to the microcomputer 751. The microcomputer 751 temporarily stores the respective input data (the key data, the X-Y-Z-axial direction acceleration data, and process result data) in the memory 752 as the transmission data which is to be transmitted to the wireless controller module 19. The wireless transmission from the communication section 75 to the wireless controller module 19 is performed periodically at predetermined time intervals. Since game processing is generally performed at a cycle of 1/60 sec., data needs to be transmitted at a cycle of a time period shorter than the cycle of the game processing. Specifically, the game process unit is 16.7 ms (1/60 sec.), and the transmission interval of the communication section 75 structured using the Bluetooth technology is 5 ms. At a time at which the transmission to the wireless controller module 19 is to be performed, the microcomputer 751 outputs the transmission data stored in the memory 752 as a series of operation information to the wireless module 753. The wireless module 753 uses, for example, the Bluetooth technology to transmit, from the antenna 754, operation information as a radio wave signal by using a carrier wave of a predetermined frequency. Thus, data from the controller 7 including the key data from the operation sections 72, the X-Y-Z-axial direction acceleration data from the acceleration sensor 701, and the process result data from the imaging information calculation section 74 are transmitted from the controller 7. The wireless controller module 19 of the game apparatus main body 5 receives the radio wave signal, and the game apparatus main body 5 demodulates or decodes the radio wave signal to obtain the series of operation information (the key data, the X-Y-Z-axial direction acceleration data, and the process result data). Based on the obtained operation information and the program, the CPU 10 of the game apparatus main body 5 performs the processing. When the communication section 75 is structured by using the Bluetooth technology, the communication section 75 can function to receive transmission data which is wirelessly transmitted from another device.

Figure 6:
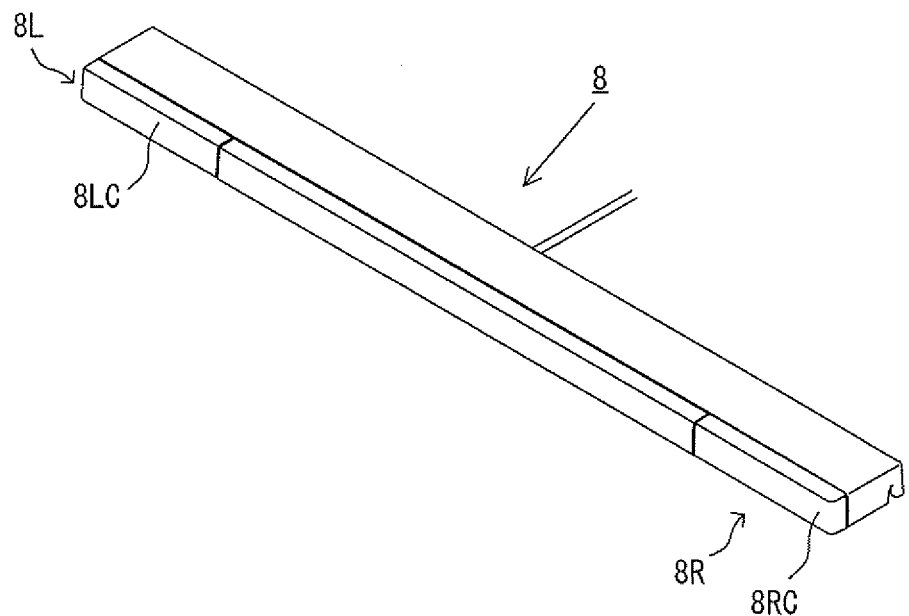
FIG. 6 is a perspective view showing an example of an external appearance of an LED module 8 shown in FIG. 1.
Figure 7:
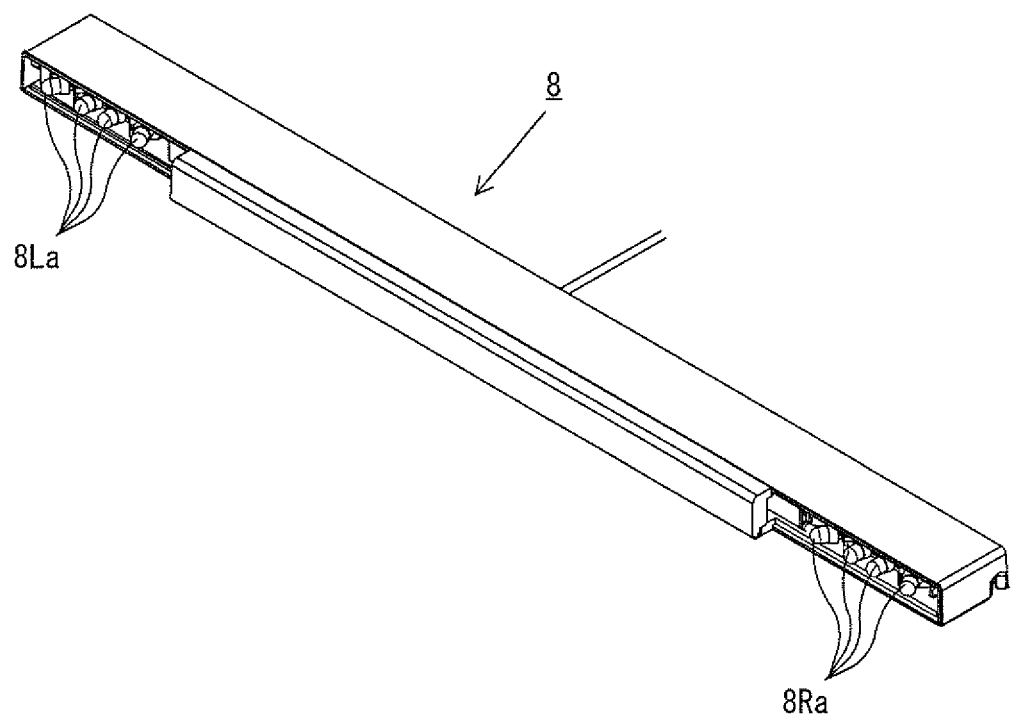
FIG. 7 is a perspective view showing an example of the LED module 8 in a state where covers 8LC and 8RC of markers 8L and 8R are removed.

With reference to FIGS. 6 and 7, the LED module 8 will be described. FIG. 6 is a perspective view showing an example of an external appearance of the LED module 8 shown in FIG. 1. FIG. 7 is a perspective view showing an example of the LED module 8 in a state where covers 8LC and 8RC of the markers 8L and 8R are removed.

As shown in FIG. 6, an outer shape of the LED module 8 is a rod shape. At both edges in the longitudinal direction of the LED module 8, the two markers 8L and 8R are fixed, respectively. The marker 8L has the cover 8LC and the infrared LEDs (infrared LEDs 8La shown in FIG. 7). The marker 8R has the cover 8RC and the infrared LEDs (infrared LEDs 8Ra shown in FIG. 7).

As shown in FIG. 7, the marker 8L has four infrared LEDs 8La. The marker 8R has four infrared LEDs 8Ra. The four infrared LEDs 8La are located close to one another, the imaging information calculation section 74 in the controller 7 picks up images of the four LEDs 8La as one image. The four LEDs 8La are arranged horizontally in a line along the longitudinal direction of the LED module 8 such that a radiation direction of infrared radiations from four LEDS 8La is radial. That is, outer two of the four infrared LEDs 8La, which are arranged horizontally in the line, are arranged so as to face an outer side compared to inner two of the infrared LEDs 8La. Accordingly, an irradiation angle of all of the four infrared LEDs 8La (an irradiation angle of the marker 8L) is widened in a horizontal direction of the LED module 8. In addition, the four infrared LEDs 8Ra are arranged in the same manner as the infrared LEDs 8La. Therefore, when the LED module 8 is fixed to the periphery of the monitor 2, the controller 7 can receive the infrared radiations from the markers 8L and 8R in a wide range including left and right sides of the front surface of the monitor 2. That is, the user can user the controller 7 in the wide range including the left and right sides of the front surface of the monitor 2. In addition, if an apparatus to be controlled by receiving an infrared light signal is present in an irradiation area of infrared light radiated from the LED module 8, also the apparatus is irradiated with the infrared light from the LED module 8. As described above, since the LED module 8 radiates infrared light over a wide range including left and right sides, the apparatus is likely to receive the infrared light from the LED module 8.

It is noted that, in another embodiment, the marker may have any number of infrared LEDs. In the case where the marker has a plurality of infrared LEDs, it is preferable that the infrared LEDs are arranged horizontally in line so as to irradiate the infrared radiation radially. Further, the marker may be configured with one infrared LED and a cover which diffuses the infrared radiation from the infrared LED.

Next, with reference to FIG. 8, the environment sensor unit 28 will be described. It is noted that FIG. 8 is a block diagram showing an example of the configuration of the environment sensor unit 28.

As shown in FIG. 8, the environment sensor unit 28 includes an atmospheric pressure sensor 281, a temperature sensor 282, a humidity sensor 283, a microcomputer 284, and a memory 285, as an example of a detection section for detecting the state of environment. For example, the environment sensor unit 28 is provided inside the game apparatus main body 5.

In accordance with an instruction from the microcomputer 284, the atmospheric pressure sensor 281 detects the atmospheric pressure at a place where the atmospheric pressure sensor 281 is present (that is, a place where the game apparatus main body 5 is present), and outputs a signal indicating the result of the detection of the atmospheric pressure, to the microcomputer 284. In accordance with an instruction from the microcomputer 284, the temperature sensor 282 detects the temperature at a place where the temperature sensor 282 is present (that is, the place where the game apparatus main body 5 is present), and outputs a signal indicating the result of the detection of the temperature, to the microcomputer 284. In accordance with an instruction from the microcomputer 284, the humidity sensor 283 detects the humidity at a place where the humidity sensor 283 is present (that is, the place where the game apparatus main body 5 is present), and outputs a signal indicating the result of the detection of the humidity, to the microcomputer 284. Typically, the memory 285 is smaller in capacity than storage means (for example, the flash memory 17) included in the game apparatus main body 5. The memory 285 is, for example, a nonvolatile memory. Based on the result of the detection outputted from each of the atmospheric pressure sensor 281, the temperature sensor 282, and the humidity sensor 283, the microcomputer 284 generates detection data indicating the result of the detection, and sequentially stores the detection data in the memory 285.

Figure 9:
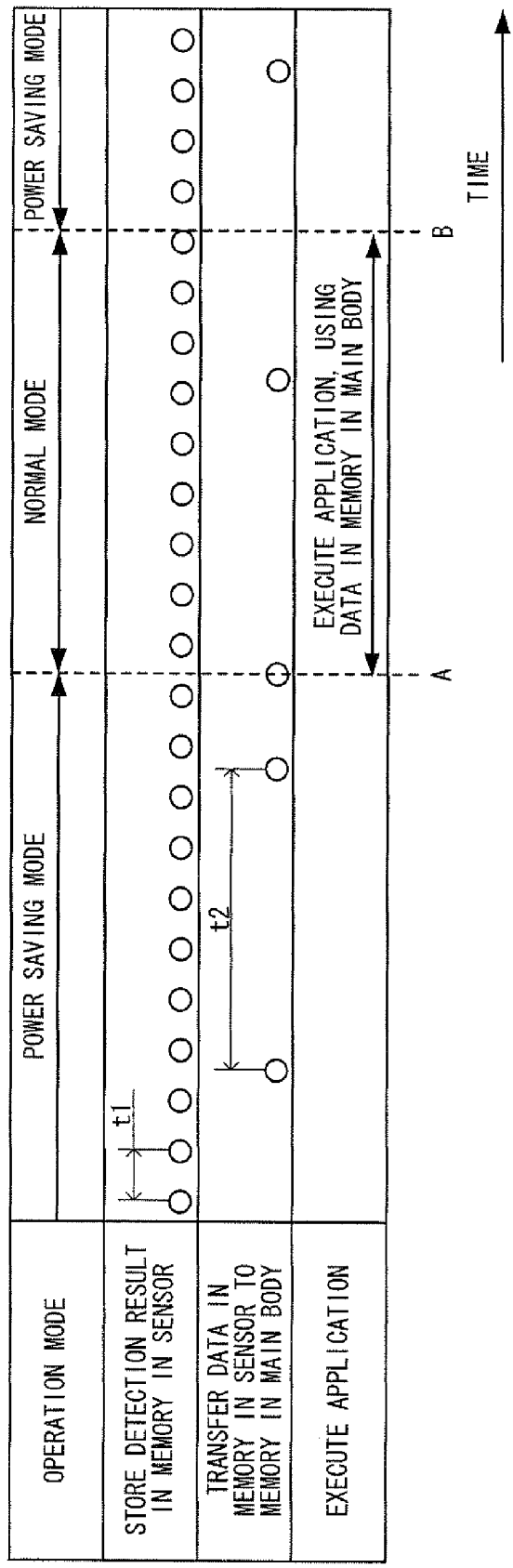
FIG. 9 is an illustrated diagram showing an example of a schedule of tasks of a game apparatus 3 shown in FIG. 1.

For example, as shown in FIG. 9, at time intervals of t1 (for example, every 10 minutes), the microcomputer 284 obtains the result of detection from each of the atmospheric pressure sensor 281, the temperature sensor 282, and the humidity sensor 283, and stores the detection data indicating the result of detection in the memory 285 in chronological order. It is noted that since, as described above, the environment sensor unit 28 is always in an active state as long as power is being supplied to the game apparatus main body 5 via the AC adapter, pieces of detection data indicating the results of detections obtained at time intervals of t1 is always being accumulated in the memory 285 irrespective of the operation mode of the game apparatus main body 5 (which includes, for example, a power saving mode in which the power supply button 24 is off, and a normal mode in which the power supply button 24 is on). For example, in a schedule of tasks shown in FIG. 9, pieces of detection data indicating the results of detections obtained at time intervals of t1 are being accumulated in the memory 285 in any one of the power saving mode (a period before a time point A) set when the power supply button 24 is turned off, the normal mode (a period from the time point A to a time point B) set while the power supply button 24 is on, and the power saving mode (after the time point B) set when the power supply button 24 is turned off again.

In addition, the microcomputer 284 outputs the detection data accumulated in the memory 285 in accordance with an instruction from the input-output processor 31. For example, at the time when the power supply button 24 of the game apparatus main body 5 is turned on (that is, in FIG. 9, the time point A when the operation mode is shifted from the power saving mode to the normal mode) or at the time when a wake-up event set by the ROM/RTC 13, which is executed at time intervals of t2 (for example, every one day), is executed, the input-output processor 31 requests the microcomputer 284 to output the detection data, and stores the outputted detection data in the flash memory 17. Therefore, pieces of detection data indicating the results of detections obtained at the time intervals of t1 are eventually stored in the flash memory 17. Here, since the memory 285 is smaller in capacity than the flash memory 17, there is a possibility that detection data beyond the capacity needs to be stored because detection data is always accumulated. In this case, the memory 285 needs to prohibit a new piece of detection data from being stored, or to delete a piece of detection data indicating the oldest result of detection. However, this problem of lack of the capacity can be avoided by transferring, at regular intervals, detection data from the memory 285 to the flash memory 17 having a larger capacity.

Figure 10:
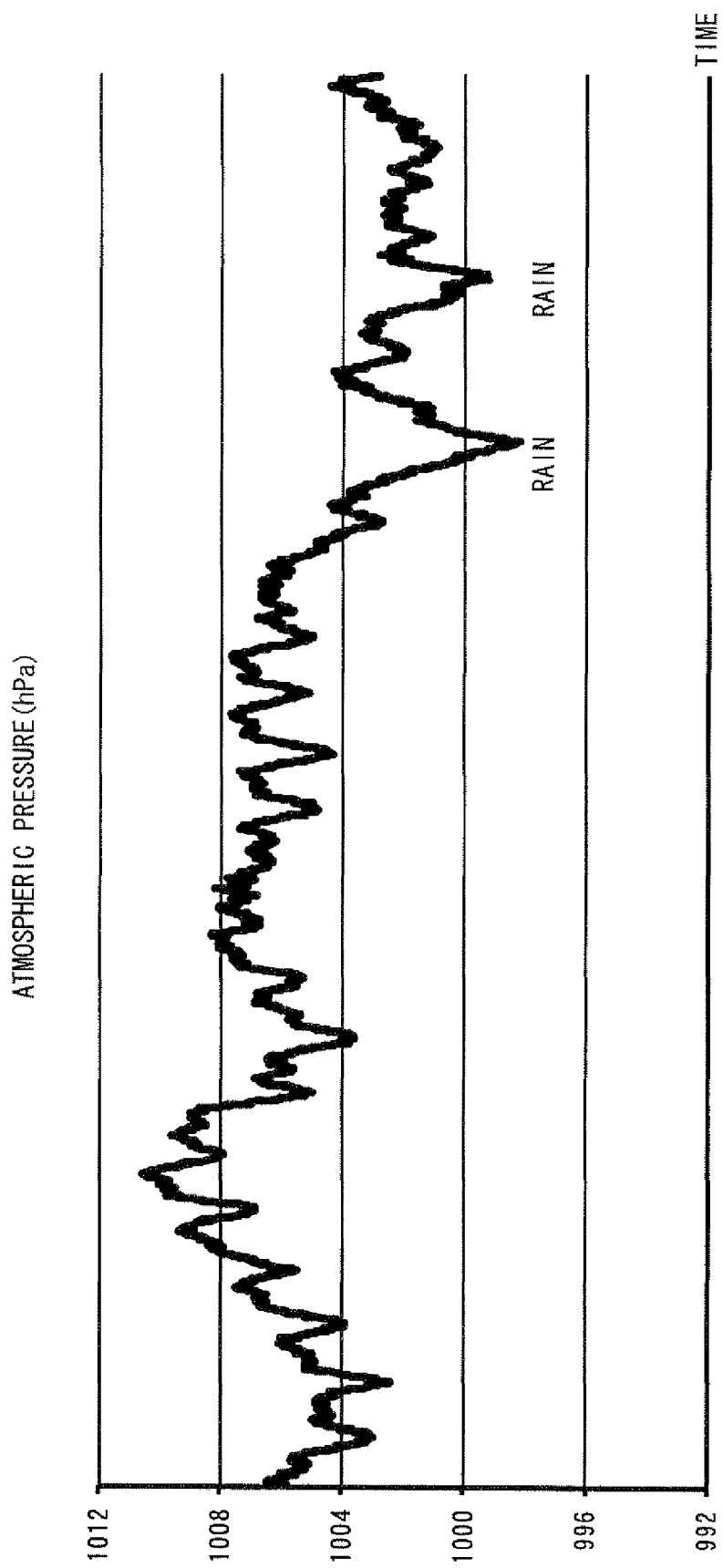
FIG. 10 is a diagram showing an example of the history of the results of detections of the atmospheric pressure obtained by an atmospheric pressure sensor 281 shown in FIG. 8.
Figure 11:
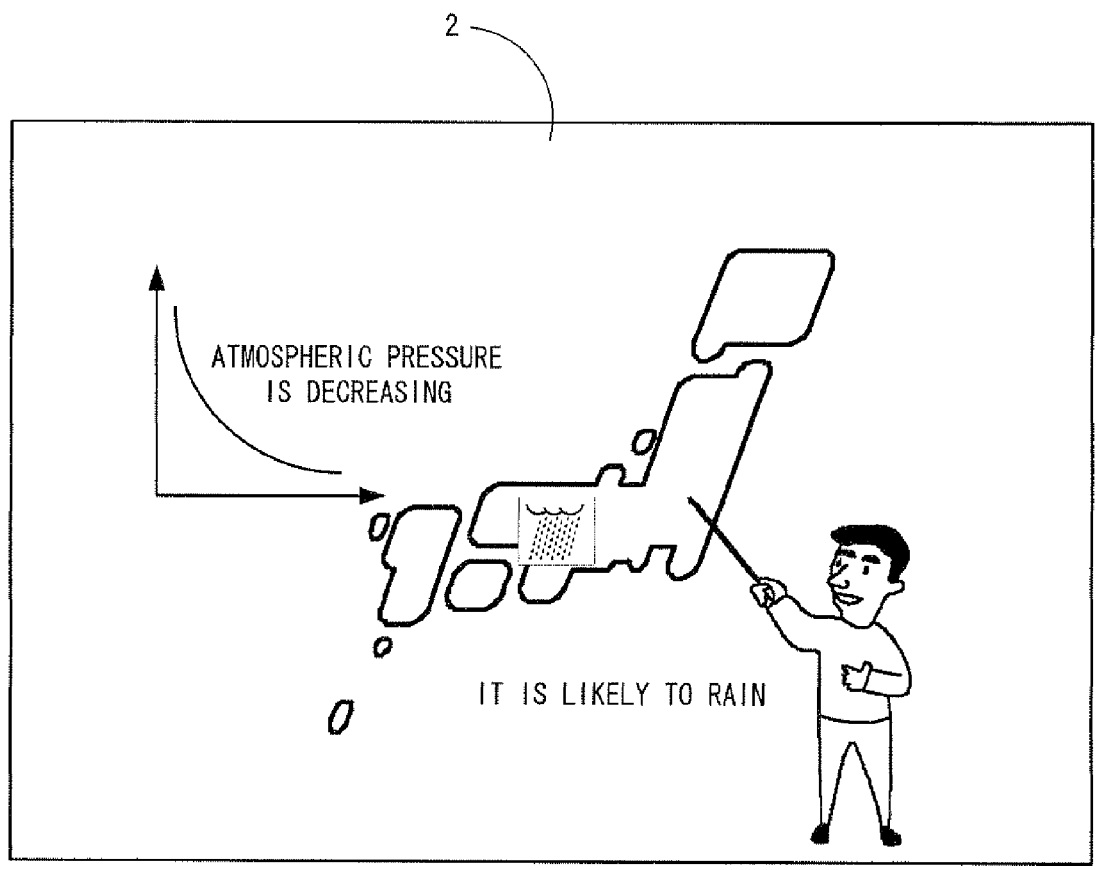
FIG. 11 is a diagram showing an example of a screen for reporting, to a user, a predicted weather by using the history of the results of detections of the atmospheric pressure shown in FIG. 10.
Figure 12:
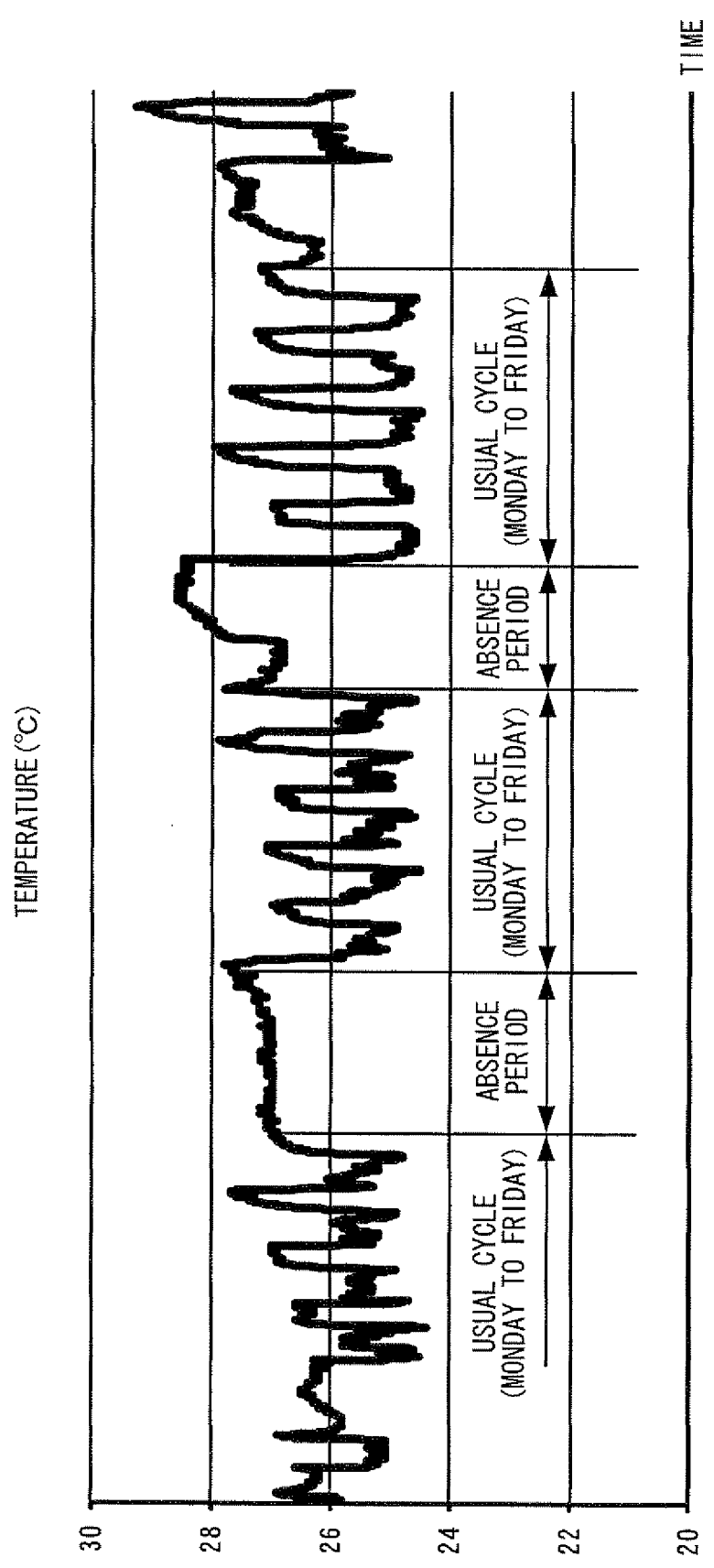
FIG. 12 is a diagram showing an example of the history of the results of detections of the temperature obtained by a temperature sensor 282 shown in FIG. 8.
Figure 13:
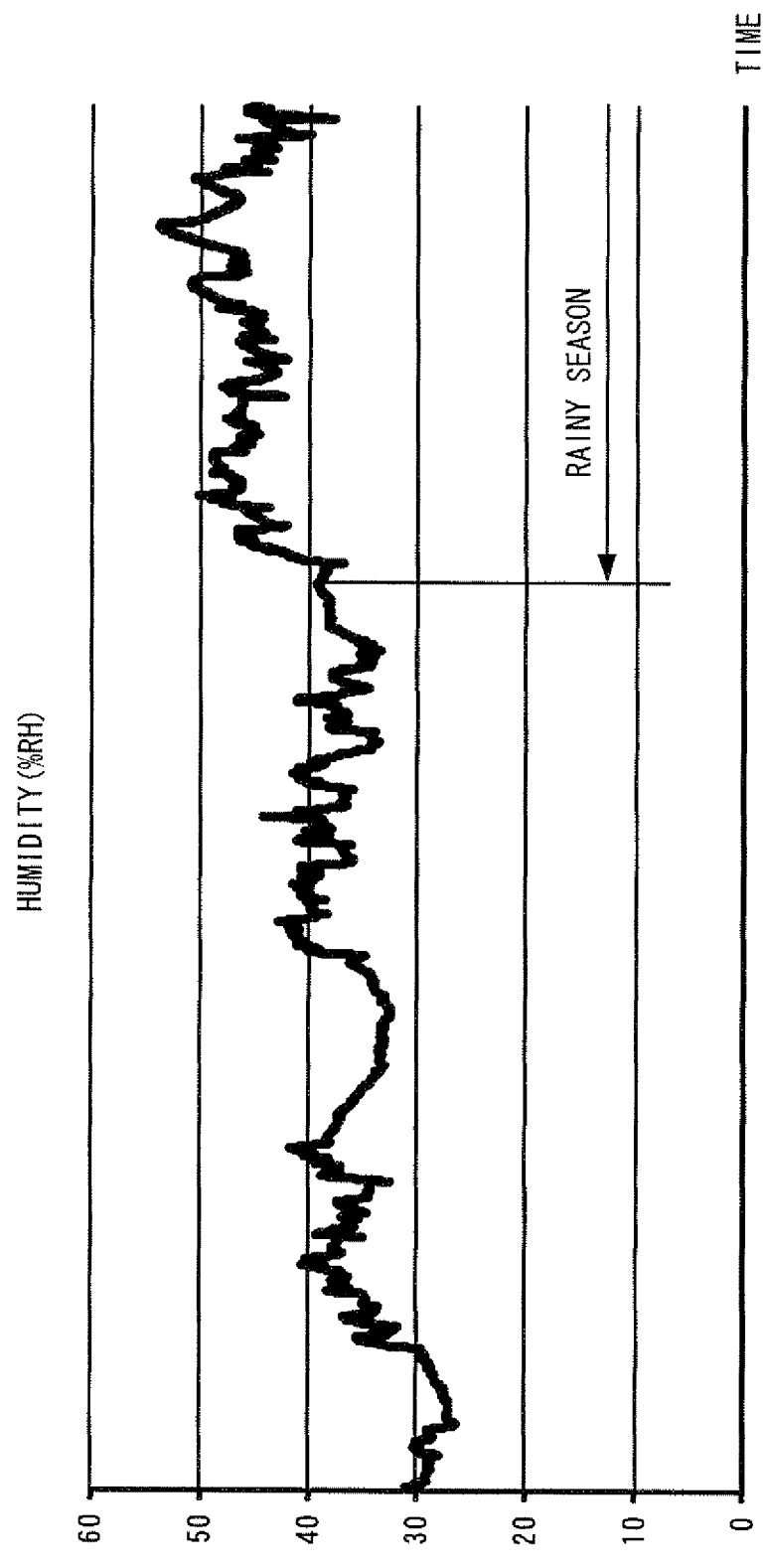
FIG. 13 is a diagram showing an example of the history of the results of detections of the humidity obtained by a humidity sensor 283 shown in FIG. 8.

In addition, the CPU 10 execute a predetermined application by using the detection data stored in the flash memory 17, in the normal mode (in a period from the time point A to the time point B in FIG. 9), thereby enabling various information processings. Hereinafter, with reference to FIG. 10 to FIG. 13, an example of execution of applications using the detection data will be described. It is noted that FIG. 10 is a diagram showing an example of the history of the results of detections of the atmospheric pressure obtained by the atmospheric pressure sensor 281. FIG. 11 is a diagram showing an example of a screen for reporting, to a user, a predicted weather by using the history of the results of detections of the atmospheric pressure shown in FIG. 10. FIG. 12 is a diagram showing an example of the history of the results of detections of the temperature obtained by the temperature sensor 282. FIG. 13 is a diagram showing an example of the history of the results of detections of the humidity obtained by the humidity sensor 283.

With reference to FIG. 10, in the history of the results of detections of the atmospheric pressure obtained by the atmospheric pressure sensor 281, in the case where the atmospheric pressure is inclined to increase, the weather in a region where the atmospheric pressure sensor 281 is present is inclined to improve. On the other hand, in the history of the results of detections of the atmospheric pressure obtained by the atmospheric pressure sensor 281, in the case where the atmospheric pressure is inclined to decrease, the weather in a region where the atmospheric pressure sensor 281 is present is inclined to deteriorate. As an example, in periods indicated by characters of "rain" in FIG. 10, it rained in the region where the atmospheric pressure sensor 281 is present, and the atmospheric pressure is inclined to decrease. The periods almost coincide with periods where the atmospheric pressure is minimum in the history of the results of detections of the atmospheric pressure. In this way, by using the history of the results of detections of the atmospheric pressure obtained by the atmospheric pressure sensor 281, it becomes possible to predict the weather in the region where atmospheric pressure sensor 281 is present.

For example, as shown in FIG. 11, by using the history of the results of detections of the atmospheric pressure obtained by the atmospheric pressure sensor 281, it becomes possible to display, on the monitor 2, the prediction of the weather in a region where the game apparatus 3 is present. Specifically, in the history of the results of detections of the atmospheric pressure obtained by the atmospheric pressure sensor 281, when the atmospheric pressure is currently inclined to decrease, information indicating that the atmospheric pressure is decreasing and information indicating that the weather in the region where game apparatus 3 is present is inclined to deteriorate (which is represented by "it is likely to rain", for example) is displayed on the monitor 2. As a result, a user of the game apparatus 3 can know the tendency of the weather in the vicinity of the place where the game apparatus 3 is present (for example, the user's house). It is noted that the prediction of the weather does not need to obtain information from another apparatus via a network or the like. The prediction of the weather is performed by using only the results of detections obtained by the atmospheric pressure sensor 281 of the game apparatus main body 5, whereby the result of the prediction can be reported to a user.

With reference to FIG. 12, in the history of the results of detections of the temperature obtained by the temperature sensor 282, the pattern of the variation in the temperature can differ depending on the presence condition of a room where the game apparatus 3 is placed. For example, in an office in summer, it is assumed that an air conditioner is turned on while a person is present in the office in the daytime, and that the air conditioner is turned off while a person is absent in the office, or in the nighttime. In the case where an air conditioner is used in such a pattern, the temperature is kept relatively low while a person is present in the office, and the temperature becomes relatively high while a person is absent in the office. Specifically, an office in which a person is present only in the daytime on weekdays (Monday to Friday) has a temperature pattern in which the temperature is kept relatively low in the daytime and becomes relatively high in the nighttime (which is a usual pattern of weekdays). On the other hand, if a person is absent the whole day, the office has a temperature pattern in which the temperature is kept relatively high without decreasing, which is a temperature pattern of absent period. In this way, by recognizing the temperature pattern in the history of the results of detections of the temperature obtained by the temperature sensor 282, the presence condition of an office where the game apparatus 3 is placed (a room where the game apparatus is placed) can be known. For example, if the history of the results of detections of the temperature obtained by the temperature sensor 282 is obtained from another game apparatus 3 having the environment sensor unit 28, it become possible to monitor the presence condition of a room where the other game apparatus 3 is placed. Specifically, another game apparatus 3 is set in a living room or the like of a house of a family member present away from a user, the history of the results of detections of the temperature obtained by the temperature sensor 282 of the other game apparatus 3 is received from the other game apparatus 3 at regular intervals, and then the temperature pattern is checked, whereby the presence condition of the family member away from the user can be reported to the user.

With reference to FIG. 13, in the history of the results of detections of the humidity obtained by the humidity sensor 283, a general tendency of the humidity can differ in accordance with the change of a time of year. For example, as shown in FIG. 13, if a rainy season starts in a region where the game apparatus 3 is present, the humidity detected by the humidity sensor 283 is inclined to increase in general. If a dry season starts in a region where the game apparatus 3 is present, the humidity detected by the humidity sensor 283 is inclined to decrease in general, and if a rainy season starts, the humidity detected by the humidity sensor 283 is inclined to increase in general. In this way, it is possible to predict the change of seasons in a region where the game apparatus 3 is present based on a general tendency in the history of the results of detections of the humidity obtained by the humidity sensor 283, and to report the result of the prediction to a user.

As described above, the operation mode of the game apparatus main body 5 is switched by task control by the ROM/RTC 13 or by the power supply button 24 being turned on/off. In the normal mode in which the power supply button 24 is on, power is supplied to the CPU 10 which executes an application using the detection data or an application that does not use the detection data, whereby it becomes possible to execute the application. On the other hand, in the power saving mode in which the power supply button 24 is off, at least, supply of power to the CPU 10 which execute such an application is restricted, and as a result, it becomes impossible to execute the application. However, the environment sensor unit 28 of the game apparatus main body 5 detects, at predetermined time intervals, the state of the environment (for example, the atmospheric pressure, the temperature, or the humidity) in a place where the game apparatus main body 5 is present, not only in the normal mode but also in the power saving mode. Therefore, information is always being obtained even while an application is not being executed, whereby the obtained information can be effectively used. By the CPU 10 executing a predetermined application using the detection data indicating the state of the environment detected, it become possible to perform various information processings. It is noted that in the game apparatus main body 5, only data indicating the state of the environment detected by the game apparatus main body 5 may be used as detection data for executing a predetermined application, or data indicating the state of the environment detected by another game apparatus main body 5 may be used.

It is noted that the game apparatus main body 5 can also execute an application that does not use the detection data, that is, the game apparatus main body 5 can execute a plurality of applications including an application using the detection data and an application that does not use the detection data. Here, it should be understood that even if the game apparatus main body 5 is executing, in the normal mode, an application that does not use the detection data, the state of the environment in a place where the game apparatus main body 5 is present can be detected in predetermined time intervals, and that even in the power saving mode after the execution of the application is finished, the state of the environment can be detected in predetermined time intervals.

In addition, in the above description, at the time intervals of t1, the state of the environment in a place where the game apparatus 3 is present is detected and pieces of detection data indicating the results of the detections are stored in the memory 285. The stored detection data is transferred to the flash memory 17 at the time intervals of t2 and when the operation mode is shifted to the normal mode. The detection data stored in the flash memory 17 is used when the CPU 10 executes an application using the detection data. However, the game apparatus 3 may be constantly detecting the state of the environment in a place where the game apparatus 3 is present, and may sequentially store pieces of detection data indicating the results of the detections in the memory 285. Alternatively, only in the power saving mode, the game apparatus 3 may detect, at the time intervals of t1, the state of the environment in a place where the game apparatus 3 is present (that is, the game apparatus 3 does not detect the state of the environment in the normal mode), and may store pieces of detection data indicating the results of the detections in the memory 285. In addition, the detection data may be transferred to the flash memory 17 only at the time intervals of t2, or may be transferred to the flash memory 17 only when the operation mode is shifted to the normal mode.

In addition, pieces of detection data indicating the results of the detections of the state of the environment obtained at the time intervals of t1 may be directly stored in the flash memory 17. Alternatively, pieces of detection data indicating the results of the detections of the state of the environment obtained at the time intervals of t1 may be stored in the memory 285, and the detection data stored in the memory 285 may be directly used in execution of an application. In either case, it is not necessary to perform the processing of transferring the detection data stored in the memory 285 to the flash memory 17 at the time intervals of t2 and when the operation mode is shifted to the normal mode.

Figure 14:
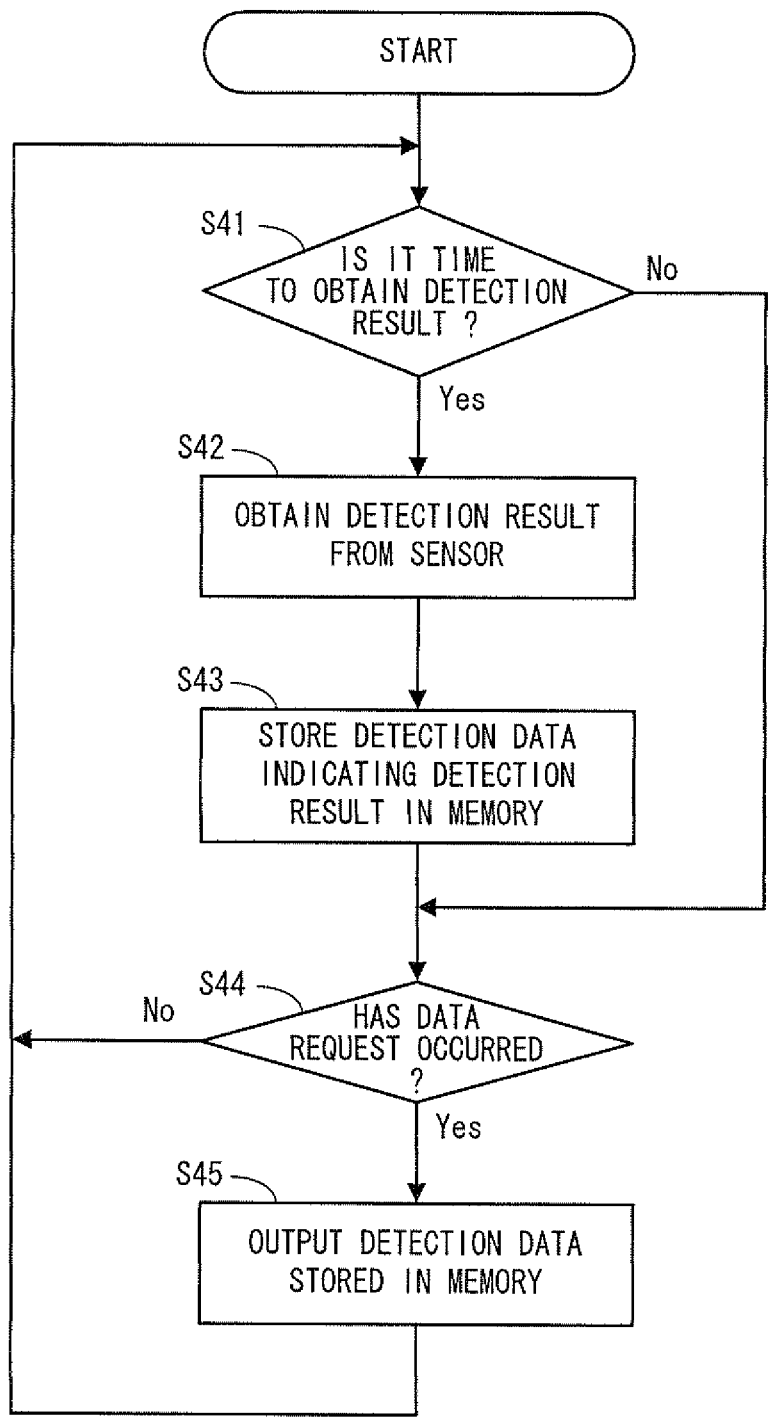
FIG. 14 is a flowchart showing an example of the processing performed by the environment sensor unit 28 shown in FIG. 2.

Next, the details of processing performed by the game system 1 will be described. First, with reference to FIG. 14, the details of processing performed by the environment sensor unit 28 will be described. It is noted that FIG. 14 is a flowchart showing an example of the processing performed by the environment sensor unit 28. In FIG. 14, each step of the processing executed by the environment sensor unit 28 (microcomputer 284) is abbreviated as "s".

When supply of power to the game apparatus main body 5 via the AC adapter is started, the microcomputer 284 of the environment sensor unit 28 executes a predetermined boot-up program. Then, a predetermined environment state detection program is loaded, and the microcomputer 284 starts to execute the environment state detection program. The flowchart in FIG. 14 shows processing performed after the above processing is completed. As previously described, as long as power is being supplied to the game apparatus main body 5 via the AC adapter, the environment sensor unit 28 is always maintained in an active state. As long as power is being supplied to the game apparatus main body 5, the processing described below is always repeated at predetermined intervals.

With reference to FIG. 14, the microcomputer 284 determines whether or not the present time is a time of obtaining a result of detection (step 41). For example, while the microcomputer 284 obtains the result of the detection from each of the atmospheric pressure sensor 281, the temperature sensor 282, and the humidity sensor 283 at the time intervals of t1 (for example, every ten minutes), the microcomputer 284 determines whether or not the present time corresponds to a time of obtaining a result of detection which comes at the time intervals of t1. If the present time is a time of obtaining a result of detection, the microcomputer 284 shifts the processing to step 42. On the other hand, if the present time is not a time of obtaining a result of detection, the microcomputer 284 shifts the processing to step 44.

In step 42, the microcomputer 284 obtains a signal indicating the result of the detection from each sensor. Then, the microcomputer 284 stores a piece of detection data indicating the result of the detection in the memory 285 in chronological order of detection (step 43), and shifts the processing to step 44. Specifically, the microcomputer 284 obtains a signal indicating the result of detection of the atmospheric pressure from the atmospheric pressure sensor 281, and stores a piece of atmospheric pressure detection data indicating the result of detection of the atmospheric pressure in the memory 285 in chronological order. In addition, the microcomputer 284 obtains a signal indicating the result of detection of the temperature from the temperature sensor 282, and stores a piece of temperature detection data indicating the result of detection of the temperature in the memory 285 in chronological order. In addition, the microcomputer 284 obtains a signal indicating the result of detection of the humidity from the humidity sensor 283, and stores a piece of humidity detection data indicating the result of detection of the humidity in the memory 285 in chronological order.

In step 44, the microcomputer 284 determines whether or not a request for data from the system LSI 11 (input-output processor 31) has occurred. As will be found from the description below, the input-output processor 31 outputs a request for data to the microcomputer 284 when the power supply button 24 is turned on and at the time intervals of t2 (for example, every one day). If the request for data has been outputted, the microcomputer 284 determines that the request for data from the system LSI 11 has occurred. If the request for data has occurred, the microcomputer 284 shifts the processing to step 45. On the other hand, if the request for data has not occurred, the microcomputer 284 returns the processing to step 41 to execute the processing from step 41 again.

In step 45, the microcomputer 284 outputs the detection data stored in the memory 285 to the system LSI 11, and then returns the processing to step 41 to execute the processing from step 41 again. Here, pieces of atmospheric pressure detection data, pieces of temperature detection data, and pieces of humidity detection data obtained at the time intervals of t1 are stored in the memory 285 in respective chronological orders. As an example, in step 45, the microcomputer 284 outputs all the pieces of atmospheric pressure detection data, all the pieces of temperature detection data, and all the pieces of humidity detection data stored in the memory 285 to the system LSI 11, and then deletes all the pieces of atmospheric pressure detection data, all the pieces of temperature detection data, and all the pieces of humidity detection data stored in the memory 285.

Figure 15:
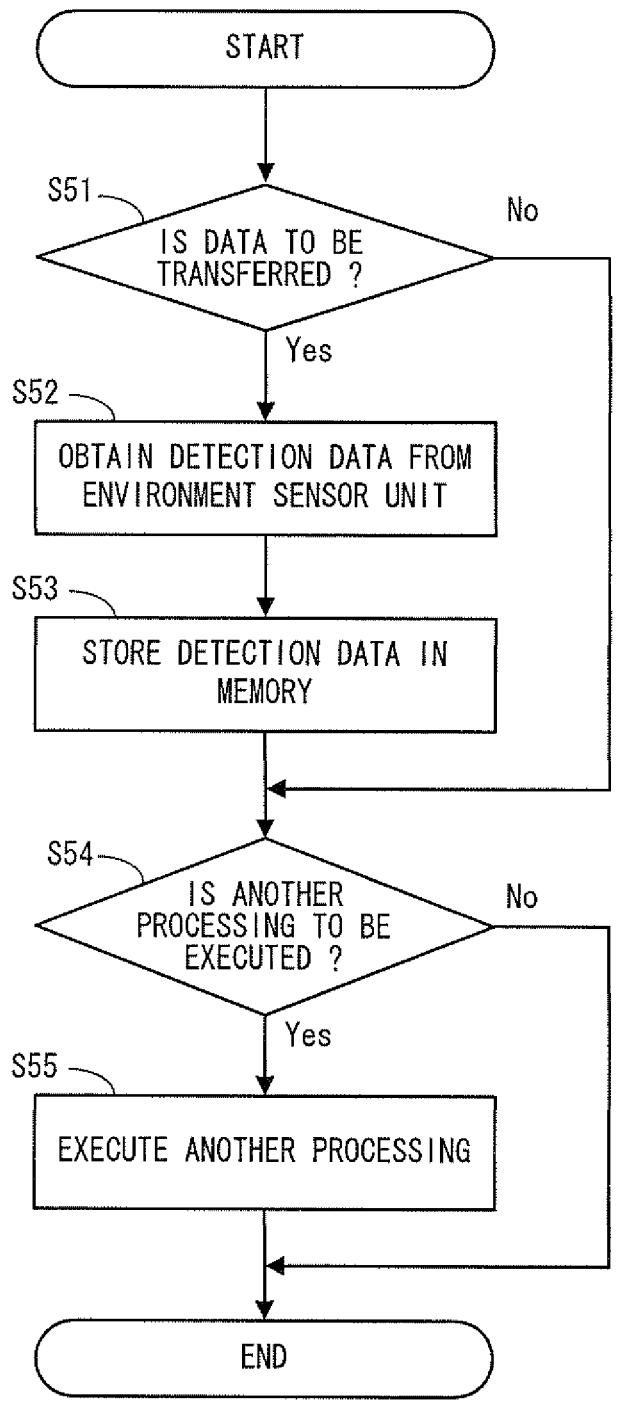
FIG. 15 is a flowchart showing an example of processing executed by the system LSI 11 (input-output processor 31) shown in FIG. 2.

Next, with reference to FIG. 15, the details of processing performed when the detection data is transferred from the memory 285 of the environment sensor unit 28 to the flash memory 17 will be described. It is noted that FIG. 15 is a flowchart showing an example of processing executed by the system LSI 11 (input-output processor 31) when the detection data is transferred from the memory 285 to the flash memory 17. In FIG. 15, each step of the processing executed by the input-output processor 31 is abbreviated as "S".

As previously described, when the power supply button 24 of the game apparatus main body 5 is turned on or when a wake-up event set by the ROM/RTC 13 is executed as alarm interrupt, the input/output processor 31, the internal main memory 35, and the flash memory 17 are booted up. When the input-output processor 31 is booted up, the input-output processor 31 executes a predetermined boot-up program. Then, a predetermined data transfer program is loaded, and the input-output processor 31 starts to execute the data transfer program. The flowchart in FIG. 15 shows processing performed after the above processing is completed. It is noted that as previously described, in the case where, in the power saving mode, a wake-up event set by the ROM/RTC 13 is executed as alarm interrupt, at least the input-output processor 31, the internal main memory 35, and the flash memory 17 are also booted up in addition to the ROM/RTC 13 and the environment sensor unit 28. Therefore, the processing described below is executed in the state in which these units have been booted up. On the other hand, in the case where the power supply button 24 of the game apparatus main body 5 is turned on, units of the game apparatus main body 5, including the CPU 10, the input-output processor 31, and the flash memory 17, are booted up. Therefore, the processing described below is executed in the state in which these units have been booted up.

With reference to FIG. 15, the input-output processor 31 which has been booted up by the alarm interrupt set by the ROM/RTC 13 or by the power supply button 24 being turned on determines whether or not to transfer data (step 51). For example, if the wake-up even set by the ROM/RTC 13 indicates transfer of data, if the input-output processor 31 has been booted up by the power supply button 24 being turned on, or if the CPU 10 has made an instruction of transferring data, the input-output processor 31 determines that data is to be transferred. If data is to be transferred, the input-output processor 31 shifts the processing to step 52. On the other hand, if data is not to be transferred, the input-output processor 31 shifts the processing to step 54.

In step 52, the input-output processor 31 obtains the atmospheric pressure detection data, the temperature detection data, and the humidity detection data from the environment sensor unit 28, and shifts the processing to the next step. For example, the input-output processor 31 outputs a data request to the environment sensor unit 28 (microcomputer 284). In response to the data request, the microcomputer 284 outputs all pieces of atmospheric pressure detection data, all pieces of temperature detection data, and all pieces of humidity detection data stored in the memory 285, to the input-output processor 31.

Next, the input-output processor 31 stores, in the flash memory 17, the atmospheric pressure detection data, the temperature detection data, and the humidity detection data obtained from the environment sensor unit 28 (step 53), and shifts the processing to step 54. For example, the input-output processor 31 stores, in the flash memory 17, the atmospheric pressure detection data, the temperature detection data, and the humidity detection data obtained in step 52 such that the atmospheric pressure detection data, the temperature detection data, and the humidity detection data are newly added, in chronological order, to the atmospheric pressure detection data, the temperature detection data, and the humidity detection data that have been already stored in the flash memory 17 in chronological order. That is, states of the environment (for example, the atmospheric pressure, the temperature, and the humidity) detected by the environment sensor unit 28 are accumulated in the flash memory 17 in chronological order. It is noted that in step 53, the input-output processor 31 may delete, from the flash memory 17, detection data indicating a state of the environment detected a predetermined time or more ago. It is noted that every time the input-output processor 31 stores a piece of detection data, the input-output processor 31 may store the time when the piece of detection data was obtained, so that a time when each piece of detection data was obtained can be determined. Alternatively, the input-output processor 31 may store, together with each piece of detection data, the time when the input-output processor 31 started to obtain the piece of detection data, and the elapsed time from the time of starting to obtain the piece of detection data. Then, the time when the piece of detection data was obtained may be calculated from the time of starting to obtaining the piece of detection data, and the intervals between measurements of detection data.

In step 54, the input-output processor 31 determines whether or not to execute another processing (which is, for example, in the case where the game apparatus 3 is connected to another apparatus, processing of transmitting data to or receiving data from the other apparatus). For example, if the wake-up event set by the ROM/RTC 13 indicates execution of another processing, or if the CPU 10 has made an instruction of executing another processing, the input-output processor 31 determines that another processing is to be executed. If another processing is to be executed, the input-output processor 31 shifts the processing to step 55. On the other hand, if another processing is not to be executed, the input-output processor 31 ends the processing of the flowchart.

In step 55, the input-output processor 31 executes the other processing, and ends the processing of the flowchart. For example, in the case where the other processing to be executed in step 55 is to transmit data to or receive data from another apparatus, the input-output processor 31 transmits transmission data stored in the flash memory 17, to another apparatus (for example, a server or another game apparatus 3), and stores, in the flash memory 17, reception data transmitted or distributed by the other apparatus. In the case where the game apparatus 3 is connected to another apparatus via a network, the input-output processor 31 can transmit, to the other apparatus, the atmospheric pressure detection data, the temperature detection data, and the humidity detection data stored in the flash memory 17, can receive the atmospheric pressure detection data, the temperature detection data, and the humidity detection data detected by the other apparatus, or can receive another form of data generated by the other apparatus using the atmospheric pressure detection data, the temperature detection data, and the humidity detection data transmitted by the game apparatus 3. Such a mode in which information processing is performed together with another apparatus will be described later. It is noted that it is not necessary that the game apparatus 3 is connected to the other apparatus so as to be able to transmit data to or receive data to the other apparatus.

Next, with reference to FIG. 16, main data used in processing for executing a predetermined application will be described. In the description below, processing of predicting the weather in a region where the game apparatus 3 is present by using the atmospheric pressure detection data stored in the flash memory 17 will be assumed as an example of an application to be executed. It is noted that FIG. 16 is a diagram showing an example of main data and main programs stored in the external main memory 12 and/or the internal main memory 35 (hereinafter, the two main memories are collectively referred to merely as a main memory) of the game apparatus main body 5.

Figure 16:
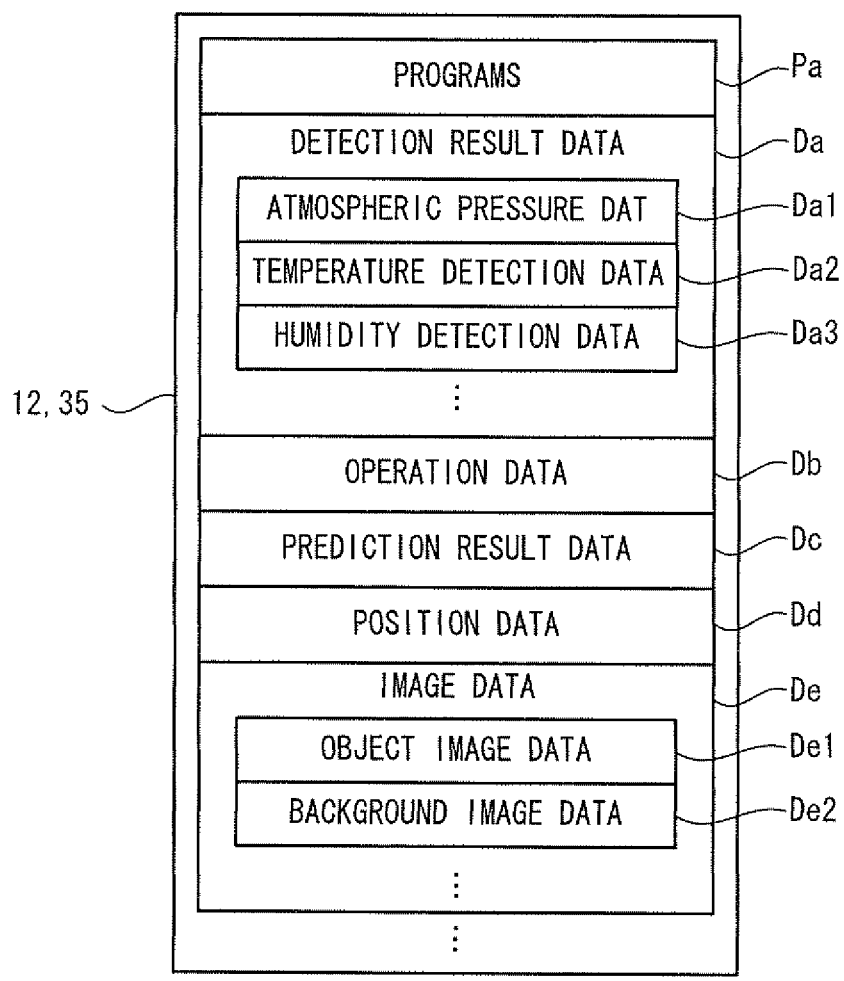
FIG. 16 is a diagram showing an example of main data and main programs stored in a main memory of the game apparatus main body 5 shown in FIG. 1.

As shown in FIG. 16, detection result data Da, operation data Db, prediction result data Dc, position data Dd, image data De, and the like are stored in a data storage area of the main memory. It is noted that besides the data shown in FIG. 16, data needed in the processing such as data that relates to an object appearing in a virtual world is also stored in the main memory. In addition, programs Pa forming an information processing program are stored in a program storage area of the main memory.

In the detection result data Da, detection data indicating the history of states of the environment detected by the environment sensor unit 28 is stored. For example, the detection result data Da includes atmospheric pressure detection data Da1, temperature detection data Da2, and humidity detection data Da3. The atmospheric pressure detection data Da1 indicates the history of the results of detections of the atmospheric pressure obtained by the atmospheric pressure sensor 281. In the atmospheric pressure detection data Da1, all or some pieces of the atmospheric pressure detection data stored in the flash memory 17 are stored as data to be used in the following processing. The temperature detection data Da2 indicates the history of the results of detections of the temperature obtained by the temperature sensor 282. In the temperature detection data Da2, all or some pieces of the temperature detection data stored in the flash memory 17 are stored as data to be used in the following processing. The humidity detection data Da3 indicates the history of the results of detections of the humidity obtained by the humidity sensor 283. In the humidity detection data Da3, all or some pieces of the humidity detection data stored in the flash memory 17 are stored as data to be used in the following processing.

In the operation data Db, a series of pieces of operation information transmitted from the controller 7 as transmission data are stored, whereby the operation data Db is updated to the latest operation data. The operation information stored in the operation data Db includes at least one of key data, acceleration data, and processing result data, and is used as data indicating an operation of a user in the following processing. It is noted that the wireless controller module 19 of the game apparatus main body 5 receives data indicating the operation information transmitted from the controller 7 with a predetermined period (for example, every $\frac{1}{200}$ second), and the received data is stored in a buffer included in the wireless controller module 19, which is not shown. Thereafter, the data stored in the buffer is loaded with a period of one frame (for example, every $\frac{1}{60}$ second) which is a processing period, whereby the operation data Db in the main memory is updated.

In the prediction result data Dc, data indicating the result of prediction of the weather in a region where the game apparatus 3 is present is stored. In the position data Dd, data indicating the position of the game apparatus 3 is stored. For example, in the position data Dd, management data stored in the flash memory 17 (positional information about the game apparatus 3 indicating the address or the like where the game apparatus 3 is present) may be stored, or in the case of using a GPS (Global Positioning System), positional information obtained from the GPS may be stored.

The image data De includes object image data De1, background image data De2, and the like. The object image data De1 is used for generating an image of an object placed in a virtual world. The background image data De2 is used for generating an image of a background placed in a virtual world.

Figure 17:
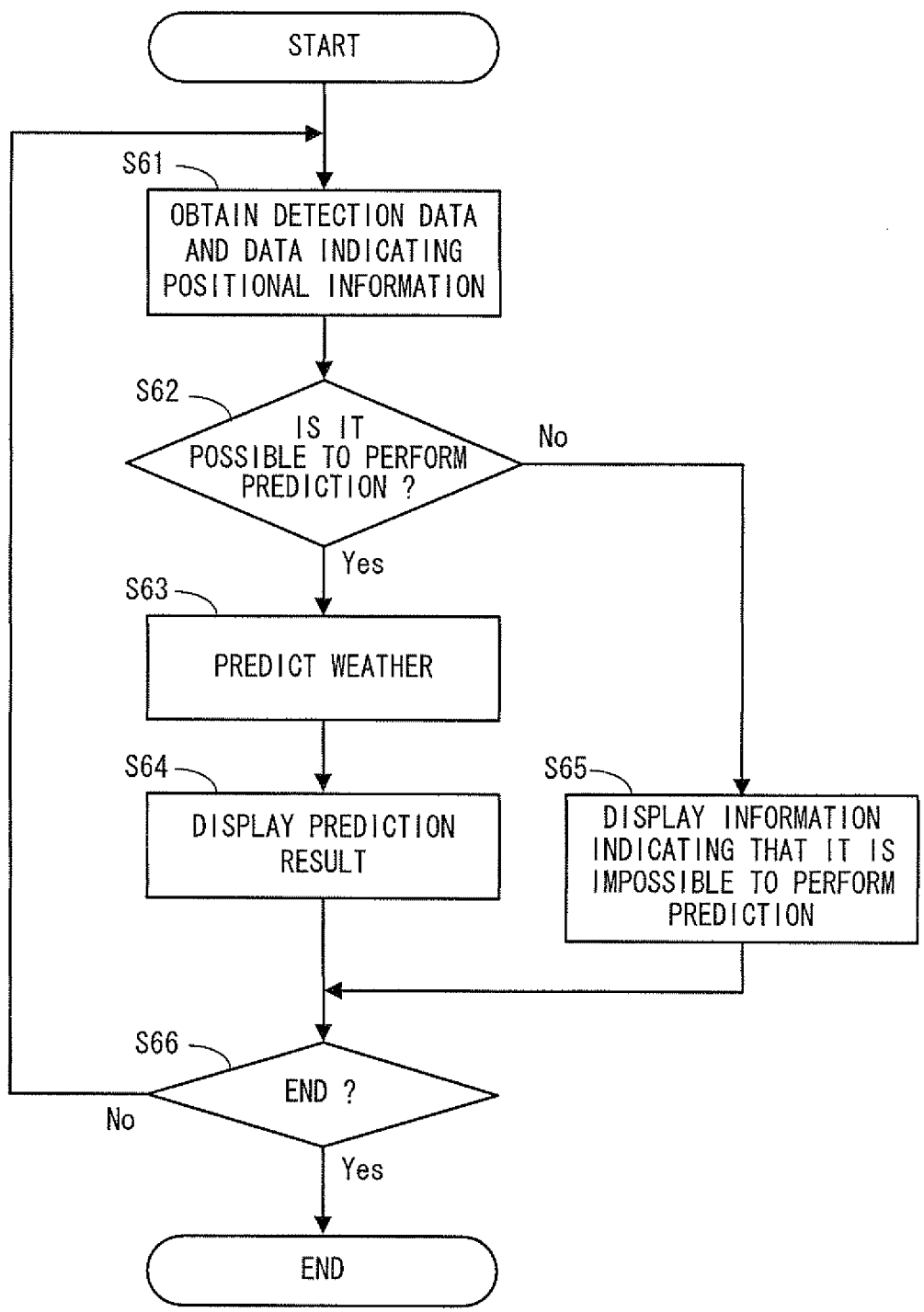
FIG. 17 is a flowchart showing an example of processing executed by the CPU 10 shown in FIG. 2.

Next, with reference to FIG. 17, the details of the processing of the CPU 10 executing a predetermined application will be described. It is noted that FIG. 17 is a flowchart showing an example of processing executed by the CPU 10. Here, in the flowchart shown in FIG. 17, processing of predicting the weather in a region where the game apparatus 3 is present by using the atmospheric pressure detection data stored in the flash memory 17 will be described, and the detailed description of other processings that do not directly relate to such processing will be omitted. In FIG. 17, each step of the processing executed by the CPU 10 is abbreviated as "S".

When the power supply button 24 of the game apparatus main body 5 is turned on, the CPU 10 of the game apparatus main body 5 executes a boot-up program stored in the ROM/RTC 13, whereby units such as the main memory are initialized, and the processing mode of the game apparatus main body 5 is shifted from the power saving mode to the normal mode. Then, an information processing program stored in the optical disc 4 or the like is loaded onto the main memory, and the CPU 10 starts to execute the information processing program. The flowchart in FIG. 17 shows processing performed after the above processing is completed.

With reference to FIG. 17, the CPU 10 obtains the history of detection data and the position data of the game apparatus 3 stored in the flash memory 17 (step 61), and shift the processing to the next step. For example, the CPU 10 stores, in the detection result data Da, as data to be used in information processing, the atmospheric pressure detection data, the temperature detection data, and the humidity detection data accumulated and stored in the flash memory 17. In addition, the CPU 10 stores, in the position data Dd, as data to be used in information processing, data indicating positional information about the game apparatus 3 included in the management data stored in the flash memory 17, or data indicating the positional information obtained from a GPS. It is noted that in the case where positional information does not need to be used for predicting the weather, for example, in the case where only the weather at the position of the game apparatus 3 is to be predicted based on data obtained by only the game apparatus 3, the position data Dd does not necessarily need to be obtained.

Next, the CPU 10 determines whether or not it is possible to predict the weather, with reference to the detection result data Da (step 62). For example, if the number of pieces of detection data stored in the detection result data Da in chronological order is less than the number needed for predicting the weather (for example, the number of detections performed in past eight hours), the CPU 10 determines that it is possible to predict the weather. If it is possible to predict the weather, the CPU 10 shifts the processing to step 63. On the other hand, if it is impossible to predict the weather, the CPU 10 shifts the processing to step 65.

In step 63, the CPU 10 predicts the weather and shifts the processing to the next step. For example, with reference to the atmospheric pressure detection data Da1, the CPU 10 predicts the weather based on the tendency of the atmospheric pressure to increase or decrease in the history of the results of detections of the atmospheric pressure obtained by the atmospheric pressure sensor 281, and stores data indicating the result of the prediction in the prediction result data Dc. Specifically, if, in the history of the results of detections of the atmospheric pressure, the atmospheric pressure is inclined to increase at the present time, the CPU 10 predicts that the weather is inclined to improve. If, in the history of the results of detections of the atmospheric pressure, the atmospheric pressure is inclined to decrease at the present time, the CPU 10 predicts that the weather is inclined to deteriorate. If, in the history of the results of detections of the atmospheric pressure, the atmospheric pressure is not inclined to increase or decrease at the present time, the CPU 10 predicts that the weather is inclined to remain as it is.

Next, the CPU 10 displays the result of the prediction of the weather on the monitor 2 (step 64), and shifts the processing to step 66. For example, if the data stored in the prediction result data Dc indicates that the weather is inclined to deteriorate, the CPU 10 displays, on the monitor 2, information indicating that the atmospheric pressure is decreasing and information indicating that the weather is inclined to deteriorate (which is represented by "it is likely to rain", for example) (see FIG. 11). It is noted that since in step 63, the weather in a region where the game apparatus 3 is present is predicted, information indicating the region where the weather is predicted may also be displayed on the monitor 2. Specifically, since data indicating the positional information about the game apparatus 3 is stored in the position data Dd, the CPU 10 can set the region where the weather is predicted, by using the position information. For example, the CPU 10 displays, on the monitor 2, a map of a predetermined range, and a mark (for example, a rainy mark, a sunny mark, or cloudy mark) indicating the result of the prediction of the weather, which is placed at a display position corresponding to the region where the game apparatus 3 is present, thereby reporting, to a user, the region where the weather is predicted, together with the result of the prediction of weather.

On the other hand, in step 65, the CPU 10 displays, on the monitor 2, information indicating that it is impossible to predict the weather (for example, "the weather cannot be predicted because the number of pieces of data is small") (step 65), and shifts the processing to step 66.

In step 66, the CPU 10 determines whether or not to end the processing. For example, if a condition for ending the processing has been satisfied, or if a user has performed an operation of ending the processing, the CPU 10 determines that the processing is to be ended. If the processing is not to be ended, the CPU 10 returns the processing to step 61 to execute the processing from step 61 again. If the processing is to be ended, the CPU 10 ends the processing shown in the flowchart. For example, in the case where the CPU 10 determines whether or not to end the processing based on an operation of ending the processing by a user, the CPU 10 obtains data indicating operation information from the controller 7, and updates the operation data Db based on the operation information. Then, if the operation data Db indicates an operation of ending the processing, the CPU 10 positively determines in step 66.

As described above, the game apparatus 3 always obtains information not only in the normal mode in which the power supply button 24 is on, but also in the power saving mode in which the power supply button 24 is off and the power consumption is restricted. In addition, the game apparatus 3 is always obtaining information even while any application using the information is not being executed, and even while any application that does not use the information is not being executed. The game apparatus 3 can effectively use the information obtained as described above. In the present embodiment, the game apparatus 3 can execute an application by using only information detected by the game apparatus 3. Therefore, even if the game apparatus 3 is not connected to a network, the game apparatus 3 can collect information and can provide a user with the result of processing that varies from day to day.

Figure 18:
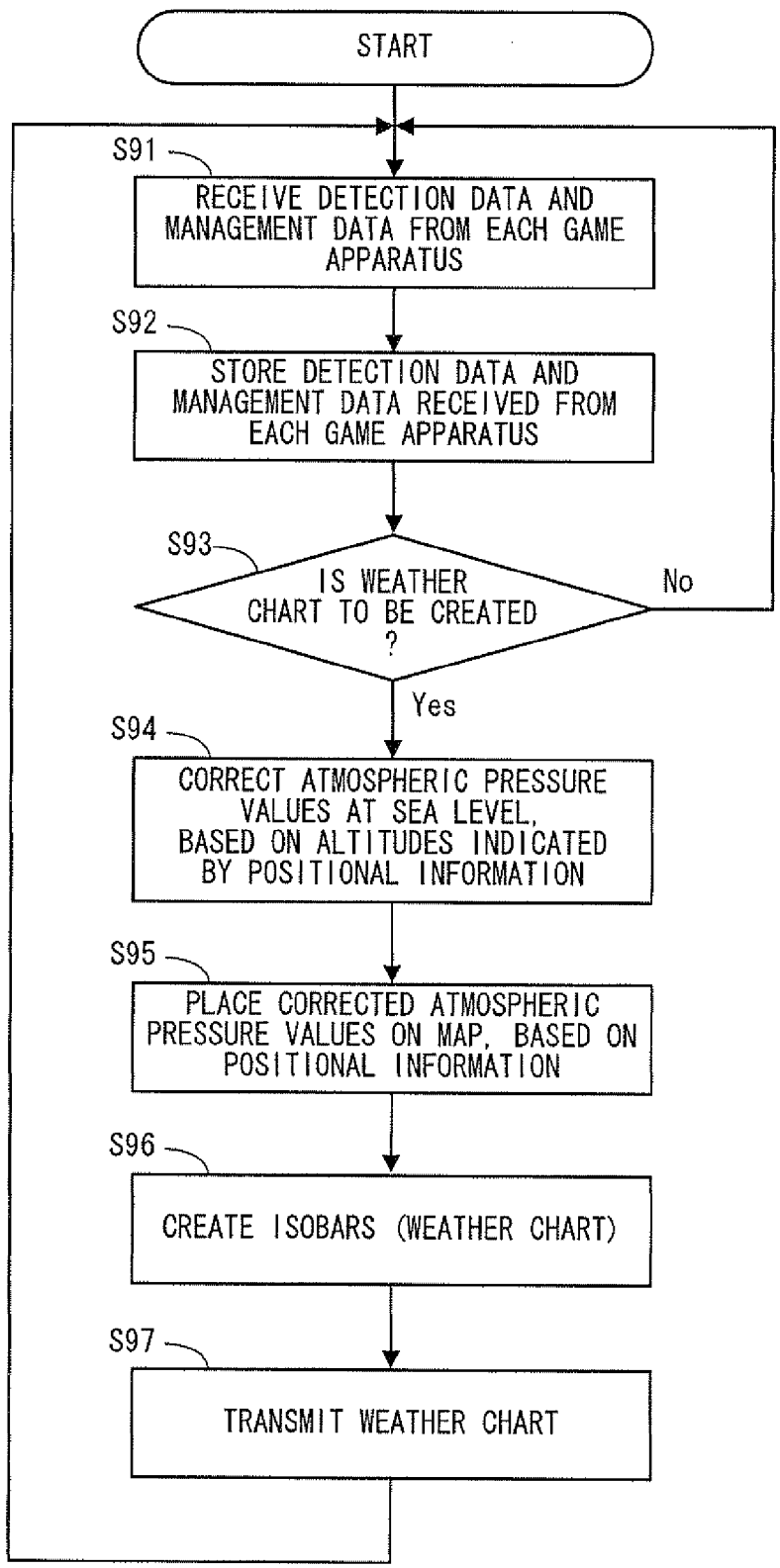
FIG. 18 is a flowchart showing an example of processing executed by a server that can transmit data to and receive data from the game apparatus 3 shown in FIG. 1.
Figure 19:
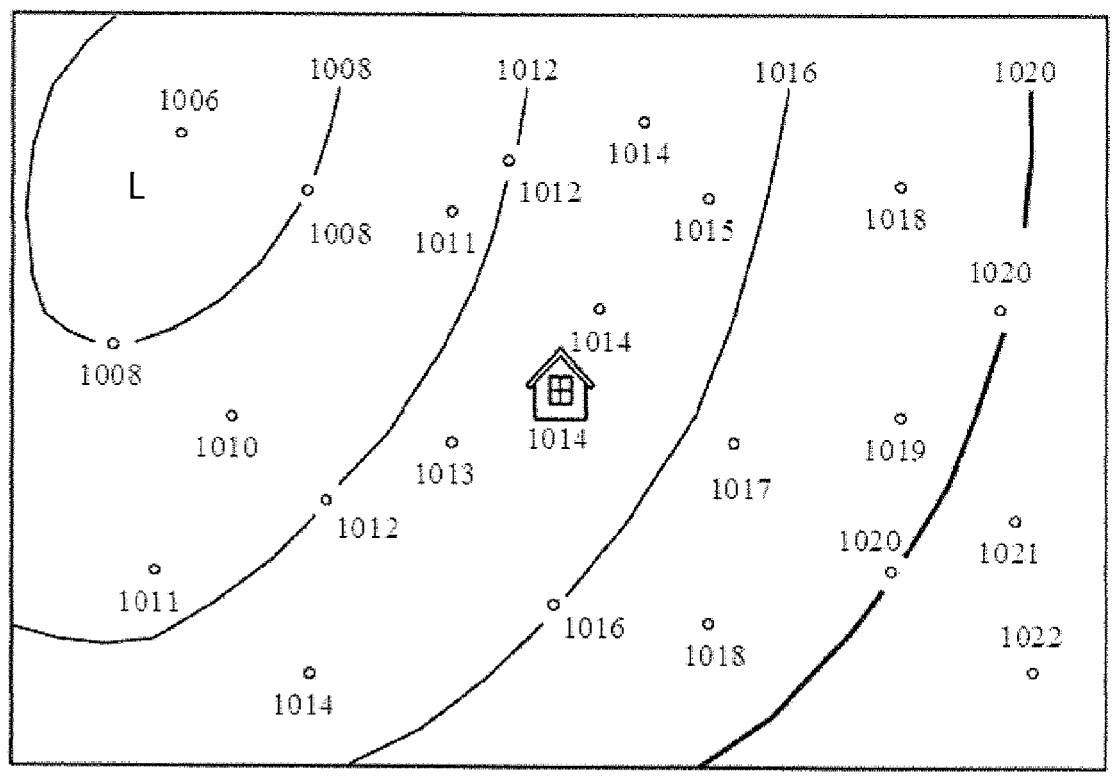
FIG. 19 is a diagram showing an example of a weather chart generated by the server.

In the above description, it has been assumed that the game apparatus 3 detects a state of the environment both in the power saving mode and in the normal mode, and that the game apparatus 3 executes an application by using only information detected by the game apparatus 3. However, if the game apparatus 3 transmits data to and receives data from another apparatus, it becomes possible to perform another information processing. Hereinafter with reference to FIG. 18 and FIG. 19, the case where the game apparatus 3 detects a state of the environment both in the power saving mode and in the normal mode, and the game apparatus 3 transmits data to and receives data from another apparatus (for example, a server), thereby performing another information processing, will be described. It is noted that FIG. 18 is a flowchart showing an example of processing executed by a server that can transmit data to and receive data from the game apparatus 3, and FIG. 19 is a diagram showing an example of a weather chart generated by the server. It is noted that in FIG. 18, each step of the processing executed by the server is abbreviated as "S".

In the description below, it will be assumed that a plurality of the game apparatuses 3 are connected to a network, and each of the plurality of the game apparatuses 3 is connected to the server via the network. In addition, it will be assumed that each of the plurality of the game apparatuses 3 can transmit data to and receive data from at least the server via the network.

With reference to FIG. 18, the server receives the detection data and the management data from each of the game apparatuses 3 connected to the network (step 91), and shifts the processing to the next step. Here, each of the game apparatuses 3 has prepared, in advance, transmission data to be transmitted to the server, in the flash memory 17. For example, each of the game apparatuses 3 stores, in the flash memory 17, the detection data and the management data (identification information and a mail address of the game apparatus 3, positional information of the game apparatus 3 (for example, an address), and the like) accumulated in the flash memory 17, as the transmission data to be transmitted to the server. If, in step 54, the wake-up event set by the ROM/RTC 13 indicates transmission of the prepared transmission data to the server, or the CPU 10 has made an instruction of transmitting the transmission data to the server, the input-output processor 31 executes processing of transmitting the transmission data to the server via the network in step 55. It is noted that if the ROM/RTC 13 has executed, as alarm interrupt, the wake-up event of transmitting the transmission data to the server, the wireless communication module 18 as well as the input-output processor 31, the internal main memory 35, and the flash memory 17 is booted up. When each of the game apparatuses 3 has transmitted the detection data and the management data, the server receives the detection data and the management data in step 91.

Next, the server stores the detection data and management data received from each of the game apparatuses 3 in step 91, in a storage device that the server has (step 92), and shifts the processing to the next step. By repeating processing of step 91 and step 92 in this way, at least data (detection data) indicating a state of the environment periodically detected by each of the game apparatuses 3 connected to the network, and the positional information (management data) of the game apparatus 3 are accumulated in the storage device of the server.

Next, the server determines whether or not to create a weather chart (step 93). For example, if a predetermined timing of creating a weather chart has come or if each of the game apparatuses 3 connected to the network has made an request for a weather chart (download request), the server determines that a weather chart is to be created. If a weather chart is to be created, the server shifts the processing to step 94. On the other hand, if a weather chart is not to be created, the server returns the processing to step 91 to execute the processing from step 91 again.

In step 94, the server corrects the value of the atmospheric pressure detected by each of the game apparatuses 3 to a value at sea level (sea level correction), based on the positional information of the game apparatus 3 stored in the storage device of the server, and shifts the processing to the next step. For example, in the case where the positional information of the game apparatus 3 includes an address and a floor on which the game apparatus 3 is placed, the server corrects the latest value of the atmospheric pressure detected by each of the game apparatuses 3 to a value at sea level by using a value obtained by adding a height corresponding to the floor to the altitude at the address. The server corrects the value of the atmospheric pressure of each of the game apparatuses 3 stored in the storage device, and stores a set of the corrected value of the atmospheric pressure and the corresponding positional information in the storage device.

Next, the server places the corrected values of the atmospheric pressure which have been calculated in step 94, at a predetermined position on the map based on the respective pieces of positional information corresponding to the values of the atmospheric pressure (step 95). Then, the server draws isobars, based on the values of the atmospheric pressure placed on the map, thereby creating a weather chart (step 96), and shifts the processing to the next step. For example, as shown in FIG. 19, the server draws isobars at intervals of 4 hPa (hectopascal) based on the values of the atmospheric pressure placed on the map. Then, the server draws a mark indicating a low pressure or a high pressure in an area enclosed by an isobar on the map, or draws a front by connecting portions at which an isobar bends at a cyclonic curvature, thereby creating a weather chart on the map and updating the weather chart stored in the storage device.

Next, the server transmits, to each of the game apparatuses 3, the weather chart created in step 96, by using the corresponding piece of management data received in step 91 (step 97), and returns the processing to step 91 to execute the processing from step 91 again. Here, when each of the game apparatuses 3 has received (downloaded) data indicating the weather chart from the server, the game apparatus 3 stores the data as reception data, in the flash memory 17. For example, if, in step 54, the wake-up even set by the ROM/RTC 13 indicates reception of data from the server, or the CPU 10 has made an instruction of receiving data from the server, the input-output processor 31 executes processing of downloading data from the server via the network, and stores the received data in the flash memory 17, in step 55. It is noted that if the ROM/RTC 13 has executed, as alarm interrupt, the wake-up event of receiving data from the server, the wireless communication module 18 as well as the input-output processor 31, the internal main memory 35, and the flash memory 17 is booted up. If each of the game apparatuses 3 has shifted to the normal mode, the game apparatus 3 displays the downloaded weather chart on the monitor 2 in accordance with an operation of a user. It is noted that by using the positional information of each of the game apparatuses 3 which are transmission destinations, the server may create a weather chart for a predetermined range including the current position of the game apparatus 3 almost at its center, or predict the weather in a region including the current position, for each of the transmission destinations. In addition, a mark (for example, a home mark shown in FIG. 19) allowing a user to know the position of the game apparatus 3 which is a transmission destination, or a mark indicating a prediction of the weather in a region including the position may be placed on the weather chart. In this case, the position of a user receiving the transmitted weather chart and the predicted weather in a region of the user are clear on the weather chart.

As described above, each of the game apparatuses 3 detects a state of the environment in the power saving mode and in the normal mode, and the server obtains the state of the environment detected by the game apparatus 3, whereby it becomes possible to perform information processing based on the states of the environments detected in multiple regions, and to perform new types of information processing based on multiple pieces of information. In the above description, the weather chart (isobars) are created by using the latest value of the atmospheric pressure detected by each of the game apparatuses 3. However, it should be understood that, if the history of the value of the atmospheric pressure detected by each of the game apparatuses 3 is used, it becomes possible to create the history of the weather chart (the transition of a pressure distribution up to the present time), and to distribute it to each of the game apparatuses 3.

In the above description, the environment sensor unit 28 is provided inside the game apparatus main body 5, and is directly connected to the system LSI 11 (input-output processor 31). However, the environment sensor unit 28 may be provided outside the game apparatus main body 5 or may be connected to the game apparatus main body 5 in a detachable manner. For example, since the game apparatus main body 5 has the extended connector 20 to which a peripheral device is to be connected, the environment sensor unit 28 may be provided outside the game apparatus main body 5 by connecting the environment sensor unit 28 via the extended connector 20 in a detachable manner. In this case, the environment sensor unit 28 is connected to the system LSI 11 (input-output processor 31) via the extended connector 20.

In addition, in the above description, when, in the power saving mode, the detection data stored in the environment sensor unit 28 is transferred to the flash memory 17 or data is transmitted to or received from another apparatus, the wake-up event set by the ROM/RTC 13 is executed, whereby the input-output processor 31 and the like are booted up. However, another type of trigger control may be used to realize the above processing. For example, the game apparatus main body 5 may be provided with, for example, an SMC (system management controller), an SMU (system management unit), or a PMU (power management unit) for controlling the input-output processor 31 and the like in booting up them in the power saving mode, whereby the above processing is realized. Alternatively, the environment sensor unit 28 may control the input-output processor 31 and the like in booting up them in the power saving mode. For example, when, in the power saving mode, the detection data stored in the environment sensor unit 28 is transferred to the flash memory 17 or data is transmitted to or received from another apparatus, the microcomputer 284 may boot up the input-output processor 31, the internal main memory 35, and the flash memory 17, to realize the processing of transferring data or the processing of transmission and reception of data.

In addition, in the above description, the game apparatus main body 5 of a stationary type is used as an example of an information processing apparatus. However, other types of apparatuses may be used. For example, an embodiment may include an information processing apparatus that is capable of obtaining an output from a sensor detecting a state of the environment (for example, the atmospheric pressure, the temperature, or the humidity). Specifically, certain example embodiments are applicable to apparatuses such as a general personal computer, a mobile phone, a PDA (Personal Digital Assistant), or a hand-held game apparatus.

For example, in the case where an embodiment is applied to a hand-held apparatus such as a mobile phone, a PDA, or a hand-held game apparatus, typically, a sensor for detecting a state of the environment is provided inside the hand-held device. When positional information about the hand-held apparatus is needed, the hand-held apparatus obtains the positional information thereof by using a GPS or the like, whereby an embodiment can be realized in the same manner as in the game apparatus main body 5. It is noted that, in the case where an embodiment includes a hand-held apparatus, since states of the environments in various places can be detected by moving the hand-held apparatus, it is possible to realize processing of, for example, comparing the environments in a plurality of places by using only detection data of the hand-held apparatus.

In addition, in the above description, an atmospheric pressure sensor, a temperature sensor, and a humidity sensor are used as an example of the detection section for detecting a state of the environment. However, certain example embodiments can be realized by providing at least one of an atmospheric pressure sensor, a temperature sensor, and a humidity sensor. For example, in the processing of predicting the weather in a region where the game apparatus 3 is present can be realized by using only the atmospheric pressure detection data. Therefore, in this case, the temperature sensor 282 and the humidity sensor 283 may not be provided.

In addition, another type of apparatus may be used to detect a state of the environment. For example, the environment sensor unit 28 may be provided with, as the detection section for detecting a state of the environment, a smell sensor, a dust sensor, a human sensor, a camera shooting an image of the periphery of the game apparatus main body 5, an illuminance sensor, an ultraviolet sensor, or the like. For example, in the case where a camera shooting an image of the periphery of the game apparatus main body 5 is used as the detection section for detecting a state of the environment, the identifications or the number of persons present in the periphery of the game apparatus main body 5 may be used as a state of the environment. In the case where an illuminance sensor or an ultraviolet sensor is used as the detection section for detecting a state of the environment, it is possible to report the strength of the sunlight or the amount of the ultraviolet light of the current day to a user.

In addition, a variety of applications can be executed by using the detection data obtained by the game apparatus 3. Hereinafter, examples of applications using the detection data will be described.

The first example of applications controls, in accordance with a state of the environment in the place where the game apparatus 3 is present, the operation of an apparatus that can be controlled by receiving an infrared light signal. For example, when the latest temperature detected by the temperature sensor 282 is higher than a predetermined first temperature, the CPU 10 turns on an air conditioner and causes the air conditioner to operate in a cooling mode. In addition, when the latest temperature detected by the temperature sensor 282 is lower than a predetermined second temperature, the CPU 10 turns on an air conditioner and causes the air conditioner to operate in a heating mode.

As an example, the game apparatus 3 is configured to be capable of shifting to the normal mode at a time set by a user, and a user sets, in advance, such a time, the first temperature, and the second temperature for the game apparatus main body 5 (for example, the flash memory 17). When the game apparatus 3 has shifted from the power saving mode to the normal mode at the set time, the CPU 10 obtains detection data indicating the latest temperature detected by the temperature sensor 282, and outputs an instruction of controlling the operation of an air conditioner, to the LED control section 27 in accordance with the temperature. Specifically, if the latest temperature obtained at the set time is higher than the first temperature, the CPU 10 instructs, via the LED control section 27, the LED module 8 to transmit an infrared light signal for turning on an air conditioner and causing the air conditioner to operate in a cooling mode. In response to the instruction, the markers 8L and 8R of the LED module 8 radiate an infrared light signal for turning on the air conditioner and causing the air conditioner to operate in a cooling mode. Then, the radiated infrared light signal is directly received at a light receiving section of the air conditioner, or the radiated infrared light signal is reflected by an object present around the air conditioner (for example, an object placed in a room, the wall of a room, or window glass), and the reflected light is received at the light receiving section. As a result, the air conditioner that has received the infrared light signal is turned on and starts to operate in a cooling mode. On the other hand, if the latest temperature obtained at the set time is lower than the second temperature, the CPU 10 instruct, via the LED control section 27, the LED module 8 to transmit an infrared light signal for turning on the air conditioner and causing the air conditioner to operate in a heating mode. In response to the instruction, the markers 8L and 8R of the LED module 8 radiate an infrared light signal for turning on the air conditioner and causing the air conditioner to operate in a heating mode. Then, the radiated infrared light signal is directly received at the light receiving section of the air conditioner, or a reflected light thereof is received at the light receiving section. As a result, the air conditioner that has received the infrared light signal is turned on and starts to operate in a heating mode.

As described above, the first example of applications enables control of an apparatus even if the apparatus is off. As a result, for example, it is possible to control the temperature in a room where the game apparatus 3 is placed even if an air conditioner is off. In addition, as previously described, the markers 8L and 8R of the LED module 8 are provided for obtaining signals according to a motion, an orientation, a position, and the like of the controller 7 which are used for calculating input coordinates and an input direction according to a position designated by the controller 7 and the direction of a movement of the controller 7. However, in the first example of applications, the LED module 8, which is used for inputting coordinates or a direction, is controlled in lighting the LED module 8, in accordance with a state of the environment (for example, the temperature) detected, whereby the LED module 8 can be used for a purpose different from the original purpose.

The second example of applications reflects, in the environment of a virtual world created by the second example of applications being executed, a weather, a season, a time of year, the amount of insolation, and the like that are predicted from a state of the environment detected by the game apparatus 3. As an example, in the case where the weather in a region where the game apparatus 3 is present is predicted as being rainy based on the history of the atmospheric pressure detected by the game apparatus 3, the CPU 10 sets, at a rainy state, the environment of a virtual world created in a game conducted by the second example of applications being executed. As another example, in the case where the season in a region where the game apparatus 3 is present is predicted as being summer based on the histories of the temperature and the humidity detected by the game apparatus 3, the CPU 10 sets, at a summer state, the environment of a virtual world created in a game conducted by the second example of applications being executed. It is noted that a weather, a season, a time, the amount of insolation, and the like to be predicted as described above may be predicted by using only a state of the environment detected by the game apparatus 3, or may be predicted by another apparatus (for example, a server) using states of the environments detected by a plurality of the game apparatuses 3.

The third example of applications calculates an indication (index) of phenomenon that temporally varies, by using a state of the environment detected by the game apparatus 3. For example, based on the histories of the temperature and the humidity detected by the game apparatus 3, the CPU 10 calculates a beer index, an influenza epidemic index, a comfort index, a discomfort index, a laundry index, and the like in a place where the game apparatus 3 is present, and displays the result of the calculation on the monitor 2 thereby reporting it to a user. It is noted that the above indices may be calculated by using only a state of the environment detected by the game apparatus 3, or may be calculated by another apparatus (for example, a server) using states of the environments detected by a plurality of the game apparatuses 3.

The fourth example of applications gives various advices to a user of the game apparatus 3, based on a state of the environment detected by the game apparatus 3. As an example, the CPU 10 calculates the difference in the temperature between the current day and the previous day, by using the history of the temperature detected by the game apparatus 3, and displays, on the monitor 2, an advice about recommended clothes for the current day, based on the difference in the temperature, thereby reporting the advice to a user. As another example, based on the histories of the temperature and the humidity detected by the game apparatus 3, the CPU 10 estimates a season or a time of year on the current day, and displays, on the monitor 2, an advice about a recommended dish (menu) for the current day, based on the temperature, and the estimated season or time of year on the current day, thereby reporting the advice to a user. It is noted that the calculation of the difference in the temperature, the estimation of a season and a time of year, and the setting of the content of an advice described above may be performed by the game apparatus 3 using only a state of the environment detected by the game apparatus 3, or may be performed by another apparatus (for example, a server) using states of the environments detected by a plurality of the game apparatuses 3.

The fifth example of applications displays, on the monitor 2, the history of a state of the environment detected by another game apparatus 3, together with the history of a state of the environment detected by the game apparatus 3, thereby comparing them. For example, the game apparatus 3 receives detection data indicating the histories of the temperature and the humidity detected by another game apparatus 3 that an acquaintance of a user has, or another game apparatus 3 that is present in a region for which a user wants to compare environments, and displays information on the monitor 2 such that the user can compare the histories of the temperature and the humidity detected by the game apparatus 3 with the histories of the temperature and the humidity detected by the other game apparatus 3. In this way, the user of the game apparatus 3 compares the environment in a room of the user where the game apparatus 3 is placed with the environment in a room of the acquaintance, or with the environment in a region that the user is interested in, thereby recognizing the difference in the environments.

The sixth example of applications monitors the presence condition in room of a user of another game apparatus 3, based on the history of a state of the environment detected by the other game apparatus 3. For example, the game apparatus 3 periodically receives, from another game apparatus 3 which, for example, a family member away from a user has, detection data indicating the history of the temperature detected by the other game apparatus 3. Then, the CPU 10 compares the history of the temperature received from the other game apparatus 3 with a temperature variation pattern for presence and a temperature variation pattern for absence, thereby estimating the presence condition in room of the user of the other game apparatus 3. The CPU 10 displays the result of the estimation on the monitor 2 thereby reporting it to the user. In this way, the user of the game apparatus 3 can periodically confirm the presence of a family member away from the user, or the like, whereby the user is kept informed of the safety of the family member.

In addition, it should be understood that the above-described shapes of the game apparatus main body 5 and the controller 7, and the shapes, the number, the positions and the like of the operation sections provided thereto are merely examples, and that any other shapes, numbers, and positions may be used. Also, it should be understood that the order of steps and the like in the above-described processing are merely examples, and that any other order of steps may be used.

In addition, in the above description, all the steps of the information processing are executed by only the game appa ratus 3. However, at least a part of the steps of the information processing may be executed by another apparatus (for example, another game apparatus or a server). For example, in the case where the game apparatus 3 is connected to another apparatus in a communicable state, the game apparatus 3 and the other apparatus may execute the information processing in a coordinated manner. As an example, the game apparatus 3 detects a state of the environment, and transmits detection data indicating the result of the detection to the other apparatus. Then, the other apparatus executes some of the steps (for example, prediction of the weather, confirmation of the presence condition, or estimation of a time of year) of the information processing that use the detection data transmitted by the game apparatus 3, and transmits data indicating the result of these steps of the information processing to the game apparatus 3. The game apparatus 3 displays the transmitted result on the monitor 2. Thus, another apparatus executes at least a part of the steps of the information processing, whereby the same processing as the information processing described above can be realized. In this way, the information processing described above can be executed by one processor or a plurality of processors being coordinated, included in an information processing system that includes at least one information processing apparatus. In addition, in the present embodiment, the microcomputer 284, the input-output processor 31, and the CPU 10 of the game apparatus 3 execute respective predetermined programs thereby performing the processing of the above flowchart. However, a dedicated circuit may be provided to the game apparatus 3, and the dedicated circuit may execute a part or all of the steps of the information processing.

In addition, the programs used in the present embodiment may be supplied to the game apparatus main body 5 via an external storage medium such as the optical disc 4, or may be stored in advance in a nonvolatile storage apparatus. Alternatively, the programs may be supplied to the game apparatus main body 5 by means of wired or wireless communication. It is noted that other than a CD-ROM, a DVD, and an optical disc storage medium of a similar type, a nonvolatile semiconductor memory, a flexible disk, a hard disk, a magnet-optical disk, a magnetic tape, or the like may be used as the information storage medium for storing the programs. Alternatively, volatile memory temporarily storing programs may be used as the information storage medium for storing the programs.

While certain example embodiments have been described in detail, the foregoing description is in all aspects illustrative and not restrictive. It should be understood that numerous other modifications and variations can be devised without departing from the scope of the invention. In addition, it should be understood that the scope of the present invention is interpreted only by the scope of the claims. In addition, it should be understood that, from the description of specific embodiments of the present invention, the one skilled in the art can easily implement the present invention in the equivalent range based on the description of the present invention and on the common technological knowledge. In addition, it should be understood that terms used in the present specification have meanings generally used in the art concerned unless otherwise specified. Therefore, unless otherwise defined, all the jargons and technical terms have the same meanings as those generally understood by one skilled in the art of the present invention. In the event of any confliction, the present specification (including meanings defined herein) has priority.

What is claimed is:

1. An information processing apparatus which executes a predetermined application, the information processing apparatus comprising:
    a detection section for detecting a state of the environment in a place where the information processing apparatus is present, wherein the detection section includes an environmental sensor;
    a first storage section for storing detection data indicating the state of the environment detected by the detection section;
    an application execution section that includes at least one hardware processor, the application execution section for executing the predetermined application;
    an operation mode switching section for switching an operation mode at least between a normal mode in which power is being supplied to the application execution section and the predetermined application can be executed, and a power saving mode in which at least supply of power to the application execution section is restricted and the predetermined application cannot be executed; and
    a detection data control section for, at least in the power saving mode, causing the detection section to detect the state of the environment, and storing, in the first storage section, at predetermined time intervals, detection data indicating the state of the environment detected by the detection section,
    wherein a game process of the predetermined application is modified based on stored historical environmental state data recorded by the environmental sensor.

2. The information processing apparatus according to claim 1, wherein the detection section includes at least one of an atmospheric pressure sensor, a temperature sensor, and a humidity sensor.

3. The information processing apparatus according to claim 1, wherein the application execution section can, in the normal mode, execute an application selected from a plurality of applications including an application using the detection data.

4. The information processing apparatus according to claim 1, wherein the detection data control section, at least both in the normal mode and in the power saving mode, causes the detection section to detect the state of the environment, and storing, in the first storage section, at predetermined time intervals, detection data indicating the state of the environment detected by the detection section.

5. The information processing apparatus according to claim 3, further comprising:
    a second storage section having a larger storage capacity than that of the first storage section; and
    a data transfer control section for, when the operation mode is shifted from the power saving mode to the normal mode, storing, in the second storage section, the detection data stored in the first storage section,
    wherein the application execution section, in executing the application using the detection data, uses the detection data stored in the second storage section.

6. The information processing apparatus according to claim 3, further comprising:
    a second storage section having a larger storage capacity than that of the first storage section; and
    a data transfer control section for, in the power saving mode, storing, in the second storage section and at a predetermined time period, the detection data stored in the first storage section, wherein the application execution section, in executing the application using the detection data, uses the detection data stored in the second storage section.

7. The information processing apparatus according to claim 1, further comprising:
   a communication section for communicating data with another apparatus via a network; and
   a data communication control section for, in the power saving mode, transmitting, at a predetermined time period, the detection data to the other apparatus via the communication section.

8. The information processing apparatus according to claim 3, wherein
   the detection section includes at least an atmospheric pressure sensor,
   the detection data control section stores, as the detection data, atmospheric pressure data indicating the value of the atmospheric pressure detected by the atmospheric pressure sensor, in the first storage section, and
   the application execution section, in executing the application using the detection data, performs processing of predicting the weather based on the atmospheric pressure data.

9. The information processing apparatus according to claim 8, wherein the application execution section executes an application of a game as the application using the detection data, and performs processing of the game by using the predicted weather.

10. The information processing apparatus according to claim 3, further comprising:
    a signal output section for outputting a radio signal having a predetermined signal pattern to another apparatus that can be remotely operated by means of wireless communication; and
    a signal pattern control section for controlling the signal pattern of the radio signal outputted by the signal output section,
    wherein the application execution section, in executing the application using the detection data, causes the signal output section to output a radio signal having a signal pattern that causes the other apparatus to operate, via the signal pattern control section, based on a comparison between a threshold value and a detection value indicated by the detection data.

11. The information processing apparatus according to claim 10, wherein
    the signal output section outputs an infrared light signal having a predetermined signal pattern to an air conditioner by means of infrared communication,
    the detection section includes at least the temperature sensor,
    the detection data control section stores, as the detection data, temperature data indicating the value of the temperature detected by the temperature sensor, in the first storage section, and
    the application execution section, in executing the application using the detection data,
       when the value of the temperature indicated by the temperature data is higher than a first threshold value, causes the signal output section to output an infrared light signal having a signal pattern that causes the air conditioner to operate in a cooling mode, and
       when the value of the temperature indicated by the temperature data is lower than a second threshold value smaller than the first threshold value, causes the signal output section to output an infrared light signal having a signal pattern that causes the air conditioner to operate in a heating mode.

12. The information processing apparatus according to claim 11, wherein
    the information processing apparatus can be operated by an input apparatus including an imaging section for taking an image of infrared light, which is an imaging target, outputted by the signal output section, and
    the application execution section, in executing an application selected from the plurality of applications, calculates a motion of the input apparatus, based on the position of the imaging target on the image taken by the imaging section, and performs processing according to the motion.

13. An information processing system including at least a server and a plurality of the information processing apparatuses according to claim 7, wherein
    the detection section includes at least an atmospheric pressure sensor,
    the detection data control section stores, as the detection data, atmospheric pressure data indicating the value of the atmospheric pressure detected by the atmospheric pressure sensor, in the first storage section,
    the data communication control section transmits the atmospheric pressure data to the server via the communication section, and
    the server draws an isobar based on the values of the atmospheric pressures indicated by the respective pieces of atmospheric pressure data obtained from the plurality of the information processing apparatuses, and creates a weather chart including the isobar.

14. An information processing method implemented on a processing system that includes at least one processor, the processing system included in at least one information processing apparatus configured to execute a predetermined application, the information processing method comprising:
    executing, via the processing system, the predetermined application;
    switching an operation mode at least between a normal mode in which power is being supplied to the processing system and the predetermined application can be executed, and a power saving mode in which at least supply of power to the processing system is restricted and the predetermined application cannot be executed;
    in the power saving mode, detecting, with an environmental sensor, a state of the environment in a place where the information processing apparatus is present and storing detection data indicating the detected state of the environment to a non-transitory storage medium; and
    modifying a game process, executed via at least one processor, based on stored historical environmental state data that has been recorded by the environmental sensor.

15. The method of claim 14, wherein the detected state of the environment includes detection of at least one weather related characteristic.

16. The apparatus of claim 1, wherein the detected state of the environment includes detection of at least one weather related characteristic.

17. The method of claim 14, further comprising:
    storing historical state data of the environment based on plural detected states of the environment.

18. The method of claim 14, further comprising:
    receiving other environmental state data detected by environmental sensors of at least one other information processing device.

19. The method of claim 18, further comprising outputting, to a display device, an environmental data display that is based on the detected state of the environment and the received other environmental state data.

20. The method of claim 18, further comprising comparing the detected state of the environment to the received other environmental state data.

21. The method of claim 14, wherein the environmental sensor includes at least one of an atmospheric pressure sensor, a temperature sensor, and/or a humidity sensor.

* * * * *